United States Patent
Ohno et al.

(10) Patent No.: US 11,561,537 B2
(45) Date of Patent: Jan. 24, 2023

(54) INFORMATION PROCESSING DEVICE, INFORMATION PROCESSING METHOD, AND SYSTEM

(71) Applicant: TOYOTA JIDOSHA KABUSHIKI KAISHA, Toyota (JP)

(72) Inventors: Mitsuyoshi Ohno, Miyoshi (JP); Daiki Kubo, Toyota (JP); Yosuke Nozaki, Toyota (JP); Tsukasa Nakanishi, Nagoya (JP); Hironori Aoyama, Toyota (JP); Seiji Yogo, Nagoya (JP); Tae Sugimura, Miyoshi (JP); Yasuhiro Kobatake, Nagoya (JP); Ryo Sato, Nisshin (JP); Takeshi Yamada, Anjo (JP); Sayaka Ninoyuu, Toyota (JP)

(73) Assignee: TOYOTA JIDOSHA KABUSHIKT KAISHA, Toyota (JP)

( * ) Notice: Subject to any disclaimer, the term of this patent is extended or adjusted under 35 U.S.C. 154(b) by 309 days.

(21) Appl. No.: 17/083,879

(22) Filed: Oct. 29, 2020

(65) Prior Publication Data
US 2021/0181735 A1 Jun. 17, 2021

(30) Foreign Application Priority Data
Dec. 16, 2019 (JP) .............................. JP2019-226260

(51) Int. Cl.
*B60P 3/00* (2006.01)
*G05D 1/00* (2006.01)
(Continued)

(52) U.S. Cl.
CPC ............ *G05D 1/0027* (2013.01); *A63B 26/00* (2013.01); *B60P 3/00* (2013.01); *G06Q 10/02* (2013.01); *G05D 2201/0213* (2013.01)

(58) Field of Classification Search
CPC ......... A63B 26/00; B60P 3/00; G05D 1/0011; G05D 1/0027; G05D 1/0246; G05D 2201/0212; G05D 2201/0213; G06Q 10/02
See application file for complete search history.

(56) References Cited

U.S. PATENT DOCUMENTS

| 10,118,577 | B1 * | 11/2018 | Sweeney | ............... G05D 1/0088 |
| 2014/0296037 | A1 * | 10/2014 | Razzaq | ............... A63B 21/4033 482/99 |

(Continued)

FOREIGN PATENT DOCUMENTS

JP 2019-053344 A 4/2019

OTHER PUBLICATIONS

Asher, The future according to Citroën: autonomous mobile gyms, Oct. 5, 2021 (Year: 2021).*

*Primary Examiner* — Behrang Badii
*Assistant Examiner* — Matthew J. Reda
(74) *Attorney, Agent, or Firm* — Sughrue Mion, PLLC

(57) ABSTRACT

An information processing device includes a controller. The controller is configured to generate, when information related to a request to use a cabin unit is acquired from a terminal of a first user who intends an activity in the cabin unit rather than traveling by the cabin unit, a command for causing a traveling unit to pick up the first user. The traveling unit is connected to and carrying a predetermined cabin unit associated with the activity of the first user. The controller is configured to generate, to the traveling unit connected to the predetermined cabin unit where a predetermined number of the first users or more is riding, a command for placing the predetermined cabin unit at a predetermined location.

20 Claims, 9 Drawing Sheets

(51) Int. Cl.
    *G06Q 10/02*     (2012.01)
    *A63B 26/00*     (2006.01)

(56) References Cited

U.S. PATENT DOCUMENTS

| | | | |
|---|---|---|---|
| 2018/0194469 A1* | 7/2018 | Evans | B64C 39/024 |
| 2018/0345971 A1* | 12/2018 | Birnschein | B60R 16/0231 |
| 2019/0080264 A1 | 3/2019 | Wasekura | |
| 2021/0080953 A1* | 3/2021 | Kuo | G07C 9/00912 |

* cited by examiner

| USER ID | CURRENT LOCATION | DESTINATION | PURPOSE |
|---|---|---|---|
| U001 | L10 | L11 | TRAVELING |
| U002 | L20 | L21 | EXERCISE |
| U003 | L30 | L31 | TRAVELING |
| U004 | L40 | L41 | EXERCISE |
| . . . | . . . | . . . | . . . |

| CABIN UNIT ID | POSITIONAL INFORMATION | PURPOSE | USER COUNT | TRAVELING UNIT ID |
|---|---|---|---|---|
| E01 | F01 | TRAVELING | 4 | G01 |
| E02 | F02 | EXERCISE | 2 | G02 |
| E03 | F03 | TRAVELING | 2 | G03 |
| E04 | F04 | EXERCISE | 4 | |
| . . . | . . . | . . . | . . . | . . . |

FIG. 6
| TRAVELING UNIT ID | POSITIONAL INFORMATION | DESTINATION | TRAVELING ROUTE | CABIN UNIT ID |
|---|---|---|---|---|
| G01 | H01 | J01 | K01 | E01 |
| G02 | H02 | J02 | K02 | E02 |
| G03 | H03 | J03 | K03 | E03 |
| G04 | H04 | J04 | K04 | |
| ... | ... | ... | ... | ... |
FIG. 7
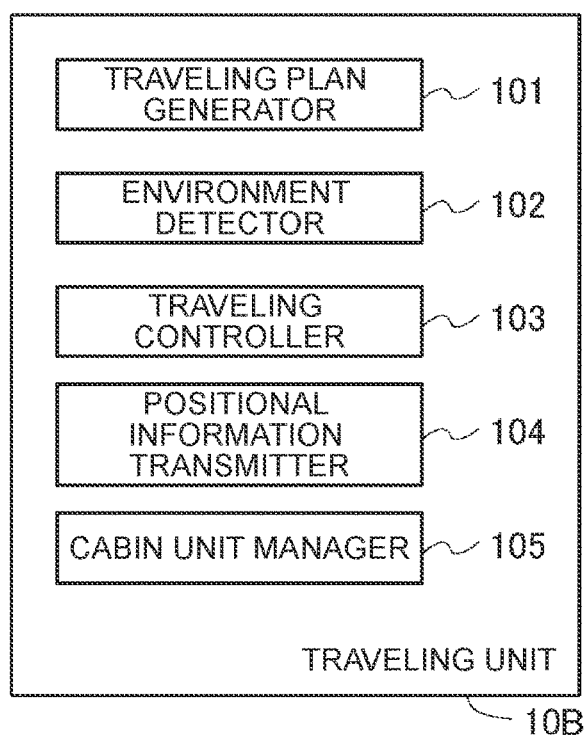
FIG. 8
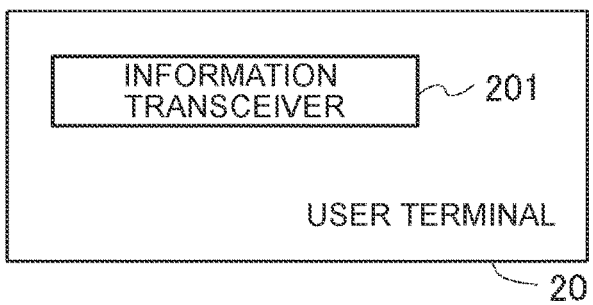

| | |
|---|---|
| PLEASE INPUT USER ID, DESTINATION, AND PURPOSE. ||
| USER ID | U001 |
| DESTINATION | . . . |
| PURPOSE | ● TRAVELING<br>○ EXERCISE |

INFORMATION PROCESSING DEVICE, INFORMATION PROCESSING METHOD, AND SYSTEM

INCORPORATION BY REFERENCE

The disclosure of Japanese Patent Application No. 2019-226260 filed on Dec. 16, 2019 including the specification, drawings and abstract is incorporated herein by reference in its entirety.

BACKGROUND

1. Technical Field

The present disclosure relates to an information processing device, an information processing method, and a system.

2. Description of Related Art

In a vehicle allocation system for a ride share platform, there is known a technology for reallocating a vehicle when a user wants to change a vehicle first allocated to the user (see, for example, Japanese Unexamined Patent Application Publication No. 2019-053344 (JP 2019-053344 A)).

SUMMARY

The present disclosure provides a technology for reducing the cost for transportation of a user.

A first aspect of the present disclosure relates to an information processing device including a controller. The controller is configured to generate, when information related to a request to use a cabin unit is acquired from a terminal of a first user who intends an activity in the cabin unit rather than traveling by the cabin unit, a command for causing a traveling unit to pick up the first user. The traveling unit is connected to a predetermined cabin unit and carrying the predetermined cabin unit. The predetermined cabin unit is associated with the activity of the first user. The controller is configured to generate, to the traveling unit connected to the predetermined cabin unit where a predetermined number of the first users or more is riding, a command for placing the predetermined cabin unit at a predetermined location.

In the first aspect, the controller may be configured to generate, when the information related to the request to use the cabin unit is acquired from the terminal of the first user, a command for causing the traveling unit to pick up the first user in a state where the predetermined cabin unit is connected, the number of the first users who use the predetermined cabin unit is smaller than the predetermined number, and a second user does not use the predetermined cabin unit. The second user may be a user who intends the traveling on the cabin unit rather than the activity in the cabin unit.

In the first aspect, the controller may be configured to generate, when the number of the first users riding on the predetermined cabin unit is smaller than the predetermined number, a command for causing the traveling unit to travel while the traveling unit is keeping connection to the predetermined cabin unit.

In the first aspect, the controller may be configured to generate, to the traveling unit connected to the cabin unit and carrying the cabin unit where a second user is riding, a command for causing the traveling unit to travel through a destination of the second user. The second user may be a user who intends the traveling on the cabin unit rather than the activity in the cabin unit.

In the first aspect, the controller may be configured to generate, after the traveling unit places the predetermined cabin unit at the predetermined location, a command for causing the traveling unit to travel while being connected to another cabin unit.

In the first aspect, the activity may be exercise, and the predetermined cabin unit may be a cabin unit including exercise equipment.

In the first aspect, the exercise equipment may be available for a second user who intends the traveling on the cabin unit rather than the activity in the cabin unit.

A second aspect of the present disclosure relates to an information processing method to be executed by a computer when information related to a request to use a cabin unit is acquired from a terminal of a first user who intends an activity in the cabin unit rather than traveling on the cabin unit. The information processing method includes generating a command for causing a traveling unit to pick up the first user. The traveling unit is connected to a predetermined cabin unit and carrying the predetermined cabin unit. The predetermined cabin unit is associated with the activity of the first user. The information processing method includes generating, to the traveling unit connected to the predetermined cabin unit where a predetermined number of the first users or more is riding, a command for placing the predetermined cabin unit at a predetermined location.

In the second aspect, the information processing method may further include generating, when the information related to the request to use the cabin unit is acquired from the terminal of the first user, a command for causing the traveling unit to pick up the first user in a state where the predetermined cabin unit is connected, the number of the first users who use the predetermined cabin unit is smaller than the predetermined number and a second user does not use the predetermined cabin unit. The second user may be a user who intends the traveling on the cabin unit rather than the activity in the cabin unit In the second aspect, the information processing method may further include generating, when the number of the first users riding on the predetermined cabin unit is smaller than the predetermined number, a command for causing the traveling unit to travel while the traveling unit is keeping connection to the predetermined cabin unit.

In the second aspect, the information processing method may further include generating, to the traveling unit connected to the cabin unit and carrying the cabin unit where a second user is riding, a command for causing the traveling unit to travel through a destination of the second user. The second user may be a user who intends the traveling on the cabin unit rather than the activity in the cabin unit.

In the second aspect, the information processing method may further include generating, after the traveling unit places the predetermined cabin unit at the predetermined location, a command for causing the traveling unit to travel while being connected to another cabin unit.

In the second aspect, the activity may be exercise, and the predetermined cabin unit may be a cabin unit including exercise equipment.

In the second aspect, the exercise equipment may be available for a second user who intends the traveling on the cabin unit rather than the activity in the cabin unit.

A third aspect of the present disclosure relates to a system including a cabin unit, a traveling unit, a terminal, and a controller. The cabin unit is configured such that a user rides on the cabin unit. The traveling unit is configured to be connected to the cabin unit and configured to carry the cabin unit. The terminal is carried by the user. The controller is configured to control the traveling unit. The traveling unit is able to travel without being connected to the cabin unit. The controller is configured to generate, when information related to a request to use the cabin unit is acquired from the terminal of a first user who intends an activity in the cabin unit rather than traveling by the cabin unit, a command for causing the traveling unit to pick up the first user. The traveling unit is connected to a predetermined cabin unit and carrying the predetermined cabin unit. The cabin unit is associated with the activity of the first user. The controller is configured to generate, to the traveling unit connected to the predetermined cabin unit where a predetermined number of the first users or more is riding, a command for placing the predetermined cabin unit at a predetermined location.

In the third aspect, the controller may be configured to generate, when the information related to the request to use the cabin unit is acquired from the terminal of the first user, a command for causing the traveling unit to pick up the first user is in a state where the predetermined cabin unit is connected, the number of the first users who use the predetermined cabin unit is smaller than the predetermined number, and a second user does not use the predetermined cabin unit. The second user may be a user who intends the traveling on the cabin unit rather than the activity in the cabin unit.

In the third aspect, the controller may be configured to generate, when the number of the first users riding on the predetermined cabin unit is smaller than the predetermined number, a command for causing the traveling unit to travel while the traveling unit is keeping connection to the predetermined cabin unit.

In the third aspect, the controller may be configured to generate, to the traveling unit connected to the cabin unit and carrying the cabin unit where a second user is riding, a command for causing the traveling unit to travel through a destination of the second user. The second user may be a user who intends the traveling on the cabin unit rather than the activity in the cabin unit.

In the third aspect, the controller may be configured to generate, after the traveling unit places the predetermined cabin unit at the predetermined location, a command for causing the traveling unit to travel while being connected to another cabin unit.

In the third aspect, the activity may be exercise, and the predetermined cabin unit may be a cabin unit including exercise equipment.

According to the first aspect, the second aspect, and the third aspect of the present disclosure, the cost for transportation of a user can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a diagram illustrating an example of the table structure of traveling unit information;

FIG. 7 is a diagram illustrating an example of the functional configuration of the traveling unit;

FIG. 8 is a diagram illustrating an example of the functional configuration of the user terminal;

DETAILED DESCRIPTION OF EMBODIMENTS

Figure 1:
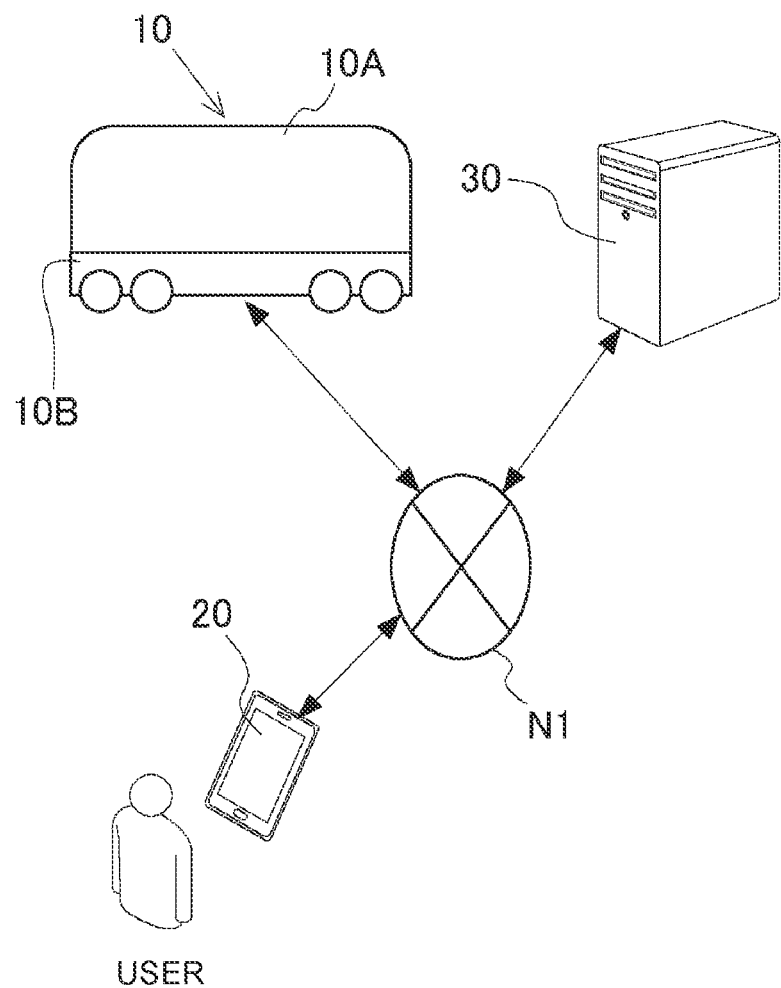
FIG. 1 is a diagram illustrating the overall configuration of an automatic driving system according to an embodiment.

A traveling unit to be managed by an information processing device according to one aspect of the present disclosure autonomously travels based on, for example, a traveling command. The traveling unit is connectable to a cabin unit, and can carry the cabin unit while being connected to the cabin unit. For example, the cabin unit may have a facility available for a user. For example, a cabin unit associated with a first user who mainly intends an activity in the cabin unit may have a facility or equipment for the activity in the cabin. A cabin unit associated with a second user who mainly intends traveling may have seats. The traveling unit can travel without being connected to the cabin unit. After the cabin unit is placed at a predetermined location, the traveling unit can move away from that location.

A controller acquires information related to a request to use the cabin unit from a terminal of the first user. The information from the terminal of the first user contains information necessary for the first user to ride on the cabin unit. For example, the information contains information related to a riding location of the first user, and information related to a purpose of using the cabin unit by the first user. A plurality of first users may ride on the cabin unit.

When the information related to the request to use the cabin unit is acquired from the terminal of the first user, the controller generates a command for causing the traveling unit to pick up the first user. The traveling unit is connected to and carrying a predetermined cabin unit associated with the activity of the first user. The cabin unit associated with the activity of the first user is a cabin unit where the first user can perform the desired activity. The cabin unit connected to the traveling unit is movable by the traveling unit. Thus, the traveling unit can carry the predetermined cabin unit to the riding location of the first user.

When the traveling unit is connected to the predetermined cabin unit where a predetermined number of first users or more is riding, the controller generates a command for causing the traveling unit to place the predetermined cabin unit at a predetermined location. The predetermined number is the number of users serving as a threshold to determine placement of the cabin unit at the predetermined location. For example, the predetermined number may be a number corresponding to the capacity of the cabin unit, or may be a number determined in consideration of costs. The predetermined location is a location where the cabin unit associated with the activity of the first user can be placed. For example, the predetermined location may be a parking area. The first user need not move because the activity in the cabin unit is the main purpose. Thus, no problem arises even if the predetermined cabin unit is prevented from traveling by being placed at the predetermined location. The cabin unit is disconnected from the traveling unit and placed at the predetermined location. Therefore, the traveling unit can be used for transporting other users. Thus, the number of traveling units to be prepared can be reduced, and therefore the cost for transportation of the users can be reduced. Accordingly, the efficiency of transportation of the users can be increased.

When the information related to the request to use the cabin unit is acquired from the terminal of the first user, the controller may generate a command for causing the traveling unit to pick up the first user while being connected to the predetermined cabin unit where the number of the first users who use the predetermined cabin unit is smaller than the predetermined number and the second user who intends the traveling on the cabin unit rather than the activity in the cabin unit does not use the predetermined cabin unit. The number of the first users who use the predetermined cabin unit may include the number of users riding on the cabin unit and the number of users expected to ride on the cabin unit. Since the first user does not mainly intend traveling, no problem arises even if the predetermined cabin unit is placed at the predetermined location. When the second user is riding on the predetermined cabin unit, the second user cannot travel. Since the second user mainly intends traveling, it is desirable that the second user avoid riding on the predetermined cabin unit placed at the predetermined location. When the first user rides on the predetermined cabin unit that is not used by the second user, the predetermined cabin unit where only the first user is riding can be placed at the predetermined location. Thus, it is possible to suppress hindrance to the traveling of the second user.

When the number of the first users riding on the predetermined cabin unit is smaller than the predetermined number, the controller may generate a command for causing the traveling unit to travel while keeping connection to the predetermined cabin unit. That is, the predetermined cabin unit may be kept movable by the traveling unit until the number of the first users riding on the predetermined cabin unit is equal to or larger than the predetermined number. In this case, the predetermined cabin unit travels so that the first users ride on the predetermined cabin unit until the number of the first users is equal to or larger than the predetermined number. Thus, more first users can ride on the predetermined cabin unit.

When the traveling unit is connected to and carrying the cabin unit where the second user who intends the traveling on the cabin unit rather than the activity in the cabin unit is riding, the controller may generate a command for causing the traveling unit to travel through a destination of the second user. The second user intends traveling, and travels to the destination by riding on the cabin unit. When the command is generated so that the traveling unit connected to the cabin unit travels through the destination of the second user, the second user can leave the cabin unit at the destination. The first user may ride on the cabin unit that travels through the destination of the second user. The first user may be permitted to travel on the cabin unit as long as the first user can perform the activity in the cabin unit. Since the first user and the second user ride together, the efficiency of use of the traveling unit can be increased.

After the traveling unit places the predetermined cabin unit at the predetermined location, the controller may generate a command for causing the traveling unit to travel while being connected to another cabin unit. After the predetermined cabin unit is placed, the traveling unit can travel alone. The traveling unit can be connected to and carry another cabin unit. Since the single traveling unit carries the plurality of cabin units, the efficiency of transportation of the users can be increased.

The activity may be exercise, and the predetermined cabin unit may be a cabin unit including exercise equipment. Some exercises require only a short time, and others require a long time. Further, some users want to take exercise for only a short time, and others want to take exercise for a long time. When the cabin unit includes the exercise equipment, the first user can take exercise for a long time at the predetermined location.

The exercise equipment may be available for the second user who intends the traveling on the cabin unit rather than the activity in the cabin unit. The second user may want some exercise while traveling to the destination. In this case, the second user rides on the cabin unit including the exercise equipment. Thus, the second user can take exercise during traveling. The first user may be forbidden to ride on this cabin unit, or may be permitted to ride on this cabin unit.

Embodiments of the present disclosure are described below with reference to the drawings. The configurations of the following embodiments are illustrative and the present disclosure is not limited to the configurations of the embodiments. The following embodiments may be combined if possible.

First Embodiment

FIG. 1 is a diagram illustrating the overall configuration of an automatic driving system 1 according to an embodiment. For example, the automatic driving system 1 includes a vehicle 10, a user terminal 20, and a server 30. The vehicle 10 includes a cabin unit 10A and a traveling unit 10B. The cabin unit 10A and the traveling unit 10B are separable from each other. The cabin unit 10A is connectable to a different traveling unit 10B. The number of cabin units 10A and the number of traveling units 10B are not limited to one in the example of FIG. 1, but may be two or more. The traveling unit 10B is a mobile object that can autonomously travel based on a traveling command generated by the server 30. In FIG. 1, a user operates the user terminal 20, and requests the use of the cabin unit 10A. Based on information input to the user terminal 20 by the user, information related to the request to use the cabin unit 10A is transmitted from the user terminal 20 to the server 30. A plurality of users may exist, and a plurality of user terminals 20 also exists depending on the number of users.

In the automatic driving system 1 illustrated in FIG. 1, when the user requests the use of the cabin unit 10A, the server 30 provides the cabin unit 10A. A plurality of users may ride on the cabin unit 10A together. The user transmits information related to the request to use the cabin unit 10A to the server 30 via the user terminal 20. The information related to the use request contains information related to a user's purpose, information related to a user's destination, and information related to a user's riding location. The user's purpose is traveling on the vehicle 10, or a predetermined activity in the vehicle 10. The predetermined activity is not limited as long as the activity can be performed in the vehicle 10. This embodiment is described under the assumption that an exercise to build up a muscle strength or a weight training (hereinafter referred to simply as "exercise") is taken as the predetermined activity. The user's destination is a location to which the user wants to travel by riding on the cabin unit 10A. When the user's purpose is the predetermined activity in the vehicle 10, the user's destination is not needed essentially. The user's riding location may be a current location of the user terminal 20, a location desired by the user, or a predetermined location (for example, a station).

A plurality of types of cabin unit 10A may be provided depending on user's purposes. For example, when the user's purpose is traveling, a cabin unit 10A having seats may be provided. For example, when the user's purpose is exercise, a cabin unit 10A having exercise equipment may be provided. The traveling unit 10B is connected to the cabin unit 10A to carry the cabin unit 10A. The cabin unit 10A is movable by being connected to the traveling unit 10B. The cabin unit 10A is movable by the traveling unit 10B in a state in which the user is riding on the cabin unit 10A. The user may also use the cabin unit 10A disconnected from the traveling unit 10B. For example, the user may use the cabin unit 10A as an exercising facility even if the cabin unit 10A is disconnected from the traveling unit 10B. The traveling unit 10B is movable in a state in which the cabin unit 10A is not connected. In FIG. 1, the cabin unit 10A and the traveling unit 10B are vertically separable from each other, but the present disclosure is not limited to this case. For example, the cabin unit 10A and the traveling unit 10B may be separable in a fore-and-aft direction. The connection and separation methods for the cabin unit 10A and the traveling unit 10B are not limited.

When the server 30 receives information related to a use request from the user terminal 20, the server 30 allocates a vehicle 10 depending on, for example, a user's purpose and a user's destination. When the user's purpose is traveling, the server 30 allocates a vehicle 10 that travels through a user's riding location and the user's destination. If there is no vehicle 10 that travels through the user's riding location and the user's destination, the server 30 may allocate a vehicle 10 that travels along a route closest to the user's riding location and the user's destination, and change the route of the vehicle 10 so that the vehicle 10 travels through the user's riding location and the user's destination.

When the user's purpose is exercise, the server 30 allocates a vehicle 10 that travels through the user's riding location and is connected to a cabin unit 10A where exercise can be taken. If there is no vehicle 10 that travels through the user's riding location, the server 30 may allocate a vehicle 10 that travels along a route closest to the user's riding location, and change the route of the vehicle 10 so that the vehicle 10 travels through the user's riding location. When the number of users riding on the cabin unit 10A where exercise can be taken is equal to or larger than a predetermined number, the server 30 transmits a command to the traveling unit 10B to separate and place the cabin unit 10A at a predetermined location. For example, the predetermined number is the number of users who can use the cabin unit 10A simultaneously. For example, the predetermined number may be a number corresponding to the capacity of the cabin unit 10A. The traveling unit 10B separated from the cabin unit 10A can be connected to another cabin unit 10A to transport other users. In the cabin unit 10A separated from the traveling unit 10B, the user can continue exercise. Since the user in this cabin unit 10A does not intend traveling, the cabin unit 10A need not be moved by the traveling unit 10B.

The cabin unit 10A, the traveling unit 10B, the user terminal 20, and the server 30 are mutually connected via a network N1. For example, the network N1 is a worldwide public communication network such as the Internet, or may be a wide area network (WAN) or other communication networks. The network N1 may include a telephone communication network for mobile phones or the like, or a wireless communication network such as Wi-Fi (registered trademark).

Hardware Configurations

Figure 2:
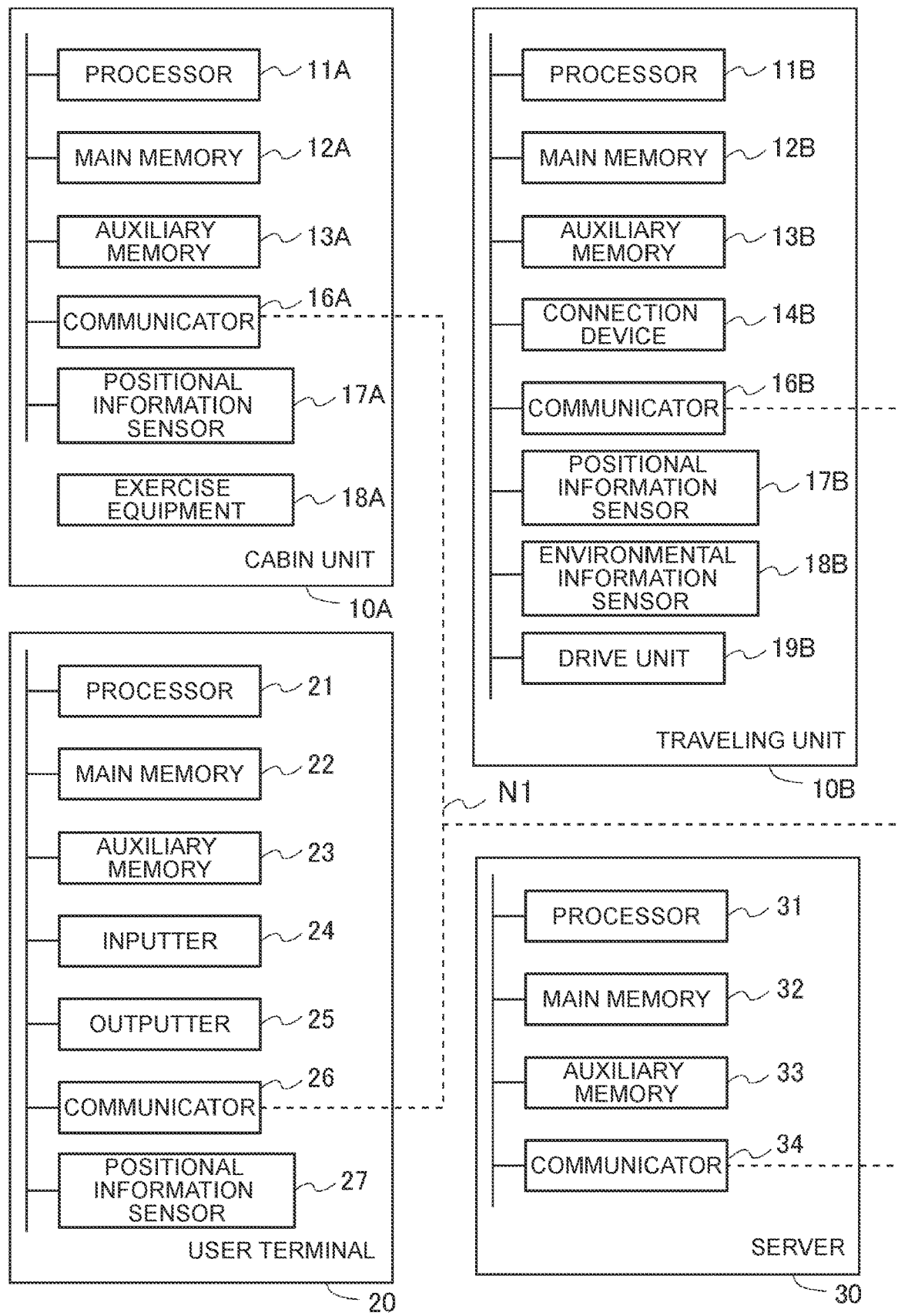
FIG. 2 is a block diagram schematically illustrating examples of the configurations of a cabin unit, a traveling unit, a user terminal, and a server that constitute the automatic driving system according to the embodiment.

The hardware configurations of the cabin unit 10A, the traveling unit 10B, the user terminal 20, and the server 30 are described with reference to FIG. 2. FIG. 2 is a block diagram schematically illustrating examples of the configurations of the cabin unit 10A, the traveling unit 10B, the user terminal 20, and the server 30 that constitute the automatic driving system 1 according to this embodiment.

The server 30 has a configuration of a general computer. The server 30 includes a processor 31, a main memory 32, an auxiliary memory 33, and a communicator 34. Those components are mutually connected via a bus.

The processor 31 is a central processing unit (CPU) or a digital signal processor (DSP). The processor 31 controls the server 30 to execute computation in various information processes. The processor 31 is an example of a "controller". The main memory 32 includes a random access memory (RAM) and a read only memory (ROM). The auxiliary memory 33 is an erasable programmable ROM (EPROM), a hard disk drive (HDD), or removable media. The auxiliary memory 33 stores an operating system (OS), various programs, and various tables. The processor 31 executes the programs stored in the auxiliary memory 33 by loading the programs on a working area of the main memory 32, and controls the components through the execution of the programs. Thus, the server 30 implements functions depending on predetermined purposes. The main memory 32 and the auxiliary memory 33 are computer readable recording media. The server 30 may be a single computer or a collaboration of a plurality of computers. Information to be stored in the auxiliary memory 33 may be stored in the main memory 32 instead. Information to be stored in the main memory 32 may be stored in the auxiliary memory 33 instead.

The communicator 34 communicates with the traveling unit 10B and the user terminal 20 via the network N1. Examples of the communicator 34 include a local area network (LAN) interface board and a wireless communication circuit for wireless communications. The LAN interface board or the wireless communication circuit is connected to the network N1.

A series of processes to be executed in the server 30 may be executed by hardware or software. The hardware configuration of the server 30 is not limited to the hardware configuration illustrated in FIG. 2. The components of the server 30 may partially or entirely be mounted on the traveling unit 10B.

Next, the traveling unit 10B is described. The traveling unit 10B includes a processor 11B, a main memory 12B, an auxiliary memory 13B, a connection device 14B, a communicator 16B, a positional information sensor 17B, an environmental information sensor 18B, and a drive unit 19B. Those components are mutually connected via a bus. The processor 11B, the main memory 12B, the auxiliary memory 13B, and the communicator 16B are similar to the processor 31, the main memory 32, the auxiliary memory 33, and the communicator 34 of the server 30, and their description is omitted.

The connection device 14B connects or disconnects the cabin unit 10A and the traveling unit 10B based on a control command generated by the processor 11B. For example, the connection device 14B includes a slope, rails, or a crane for connecting the cabin unit 10A to the traveling unit 10B. The connection device 14B includes an actuator, which is actuated to connect or disconnect the cabin unit 10A and the traveling unit 10B. The connection method for the cabin unit 10A and the traveling unit 10B is not limited.

The communicator 16B is a communication device for connecting the traveling unit 10B to the network N1. For example, the communicator 16B is a circuit for communication with other devices (for example, the server 30) via the network N1 by using a mobile communication service (telephone communication network such as 5th Generation (5G), 4th Generation (4G), 3rd Generation (3G), or Long Term Evolution (LTE)) or a wireless communication network such as Wi-Fi (registered trademark).

The positional information sensor 17B acquires positional information (for example, latitude and longitude) of the traveling unit 10B in every predetermined period. Examples of the positional information sensor 17B include a global positioning system (GPS) receiver and a wireless communicator. For example, the information acquired by the positional information sensor 17B is stored in the auxiliary memory 13B and transmitted to the server 30.

The environmental information sensor 18B senses the condition of the traveling unit 10B or the periphery of the traveling unit 10B. Examples of the sensor for sensing the condition of the traveling unit 10B include an acceleration sensor, a speed sensor, and an azimuth sensor. Examples of the sensor for sensing the periphery of the traveling unit 10B include a stereoscopic camera, a laser scanner, a Light Detection and Ranging (LIDAR) sensor, and a radar.

The drive unit 19B causes the traveling unit 10B to travel based on a control command generated by the processor 11B. For example, the drive unit 19B includes a motor, an inverter, a brake, or a steering mechanism for driving wheels of the traveling unit 10B. The traveling unit 10B autonomously travels by driving the motor, the brake, or other elements in response to the control command.

Next, the cabin unit 10A is described. The cabin unit 10A includes a processor 11A, a main memory 12A, an auxiliary memory 13A, a communicator 16A, and a positional information sensor 17A. Those components are mutually connected via a bus. The cabin unit 10A further includes exercise equipment 18A available for users. The processor 11A, the main memory 12A, the auxiliary memory 13A, the communicator 16A, and the positional information sensor 17A of the cabin unit 10A are similar to the processor 11B, the main memory 12B, the auxiliary memory 13B, the communicator 16B, and the positional information sensor 17B of the traveling unit 10B, and their description is omitted. The processor 11A, the main memory 12A, the auxiliary memory 13A, the communicator 16A, and the positional information sensor 17A are not needed essentially.

The exercise equipment 18A may be a device for building up a muscle strength or a device for keeping health. The exercise equipment 18A need not be provided in all the cabin units 10A. That is, the exercise equipment 18A may be omitted in a cabin unit 10A where a user rides for traveling.

Next, the user terminal 20 is described. The user terminal 20 is a small-size computer such as a smartphone, a mobile phone, a tablet terminal, a personal digital assistant, a wearable computer (such as a smart watch), or a personal computer (PC). The user terminal 20 includes a processor 21, a main memory 22, an auxiliary memory 23, an input unit 24, an output unit 25, a communicator 26, and a positional information sensor 27. Those components are mutually connected via a bus. The processor 21, the main memory 22, the auxiliary memory 23, the communicator 26, and the positional information sensor 27 are similar to the processor 11B, the main memory 12B, the auxiliary memory 13B, the communicator 16B, and the positional information sensor 17B of the traveling unit 10B, and their description is omitted.

The input unit 24 receives user's input operations. Examples of the input unit 24 include a touch panel and a push button. The output unit 25 presents information to the user. Examples of the output unit 25 include a liquid crystal display (LCD), an electroluminescence (EL) panel, a loudspeaker, and a lamp. The input unit 24 and the output unit 25 may be provided as a single touch panel display.

Functional Configuration: Server

Figures 3, 4, 5:
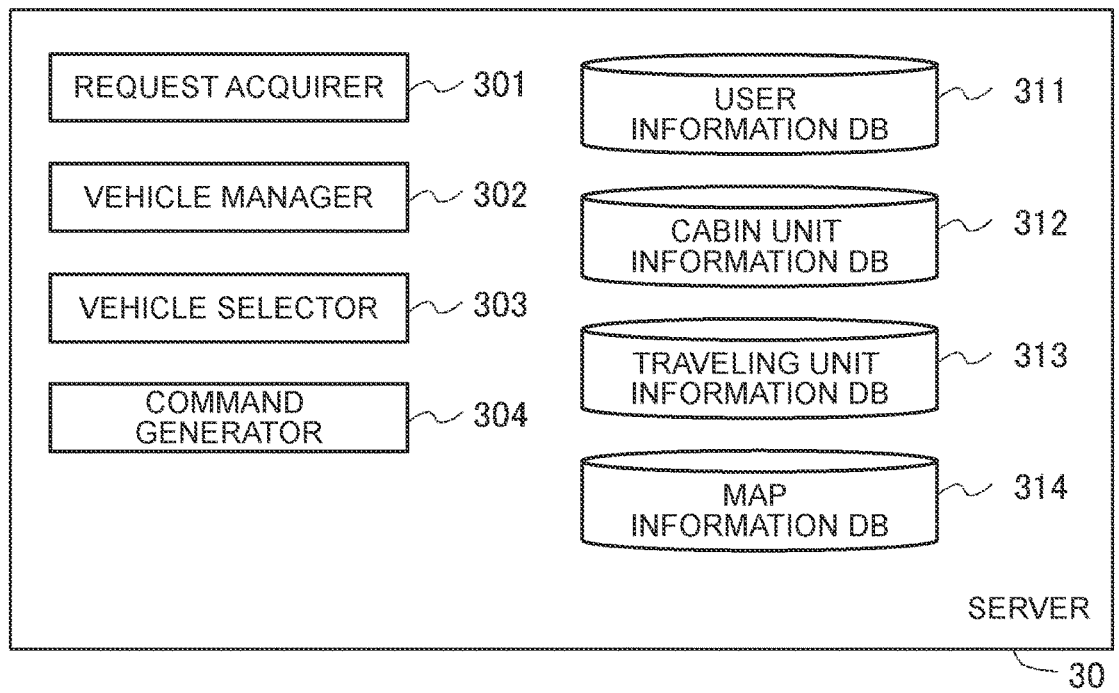
FIG. 3 is a diagram illustrating an example of the functional configuration of the server.
FIG. 4 is a diagram illustrating an example of the table structure of user information.
FIG. 5 is a diagram illustrating an example of the table structure of cabin unit information.

FIG. 3 is a diagram illustrating an example of the functional configuration of the server 30. The server 30 includes, as functional elements, a request acquirer 301, a vehicle manager 302, a vehicle selector 303, a command generator 304, a user information database (DB) 311, a cabin unit information DB 312, a traveling unit information DB 313, and a map information DB 314. For example, the request acquirer 301, the vehicle manager 302, the vehicle selector 303, and the command generator 304 are functional elements provided such that the processor 31 of the server 30 executes various programs stored in the auxiliary memory 33.

For example, the user information DB 311, the cabin unit information DB 312, the traveling unit information DB 313, and the map information DB 314 are relational databases constructed such that a program of a database management system (DBMS) to be executed by the processor 31 manages data stored in the auxiliary memory 33. A subset of the functional elements of the server 30 or a subset of processes to be executed by the functional elements may be implemented by other computers connected to the network N1.

For example, the request acquirer 301 acquires a use request transmitted from the user terminal 20. The use request is information on a user's request to use the cabin unit 10A and the traveling unit 10B for traveling or exercise. For example, the use request contains information related to a user's current location (user's positional information), information related to a user's destination, and information related to a user's purpose. The use request is generated in the user terminal 20 when the user inputs predetermined information via the input unit 24 of the user terminal 20. When the user's purpose is exercise, the user's destination may be the predetermined location. The request acquirer 301 stores the information related to the current location, the information related to the destination, and the information related to the purpose that are contained in the use request in the user information DB 311 described later in association with a user ID.

For example, the request acquirer 301 acquires a leaving request transmitted from the user terminal 20. The leaving request is information on a request to be made by the user for the server 30 to leave the cabin unit 10A because of, for example, the end of exercise. The leaving request is information to be transmitted from the user terminal 20. The leaving request contains the user ID.

The vehicle manager 302 manages various types of information related to each cabin unit 10A and each traveling unit 10B. For example, the vehicle manager 302 manages current locations and destinations of the cabin unit 10A and the traveling unit 10B. For example, each of the current locations and destinations is represented by a latitude and a longitude. For example, the vehicle manager 302 acquires and manages positional information transmitted from the cabin unit 10A in every predetermined period or positional information transmitted from the cabin unit 10A in response to a request from the server 30. For example, the vehicle manager 302 acquires and manages positional information transmitted from the traveling unit 10B in every predetermined period or positional information transmitted from the traveling unit 10B in response to a request from the server 30. When the cabin unit 10A is connected to the traveling unit 10B, the positional information of the connected cabin unit 10A may be handled as being identical to the positional information of the traveling unit 10B. When the cabin unit 10A is disconnected from the traveling unit 10B, the positional information of the cabin unit 10A may be handled as being identical to the positional information of the traveling unit 10B when the traveling unit 10B disconnects the cabin unit 10A. In this case, the positional information sensor 17A of the cabin unit 10A or other components can be omitted. The vehicle manager 302 stores the positional information of the cabin unit 10A in the cabin unit information DB 312 in association with a cabin unit ID. The cabin unit ID is an identifier unique to the cabin unit 10A. The vehicle manager 302 stores the positional information of the traveling unit 10B in the traveling unit information DB 313 described later in association with a traveling unit ID. The traveling unit ID is an identifier unique to the traveling unit 10B.

For example, the vehicle manager 302 manages a destination of each traveling unit 10B. When a user riding on the cabin unit 10A intends traveling (hereinafter referred to also as "second user"), the destination of the traveling unit 10B is a destination of the second user. The destination of the second user is contained in a use request. When a plurality of second users is riding on the cabin unit 10A, a destination of any second user may be a final destination of the traveling unit 10B, and a destination of another second user may be a stopover location of the traveling unit 10B. When a user riding on the cabin unit 10A is a second user, the destination of the traveling unit 10B may be determined in advance.

When a user riding on the cabin unit 10A intends exercise (hereinafter referred to also as "first user"), the destination of the traveling unit 10B is the predetermined location. The predetermined location is a location where the cabin unit 10A is disconnected from the traveling unit 10B. When the number of first users riding on the cabin unit 10A is smaller than the predetermined number, a temporary destination or an arbitrary destination may be set so that the traveling unit 10B continues traveling. Not only the first user but also the second user may ride on a cabin unit 10A having exercise equipment. In this case, a destination of the second user may be the destination of the traveling unit 10B. The vehicle manager 302 stores information related to the destination of the traveling unit 10B in the traveling unit information DB 313 in association with the traveling unit ID.

The vehicle manager 302 manages a user's purpose associated with each cabin unit 10A. The user's purpose associated with the cabin unit 10A may be determined in advance for each cabin unit 10A, or may be determined depending on a user riding on the cabin unit 10A. For example, the vehicle manager 302 may determine a purpose of a user who uses the cabin unit 10A first as the purpose associated with the cabin unit 10A. The vehicle manager 302 stores the associated purpose in the cabin unit information DB 312 in association with the cabin unit ID.

The vehicle selector 303 selects a cabin unit 10A and a traveling unit 10B to be allocated to a user. The vehicle selector 303 selects the cabin unit 10A and the traveling unit 10B depending on a user's purpose and a user's destination. When the user's purpose is traveling, the vehicle selector 303 selects, for example, a cabin unit 10A and a traveling unit 10B associated with traveling. The vehicle selector 303 selects the cabin unit 10A and the traveling unit 10B associated with traveling by accessing the user information DB 311, the cabin unit information DB 312, the traveling unit information DB 313, and the map information DB 314. For example, the vehicle selector 303 selects a traveling unit 10B that satisfies conditions that a planned traveling route of the traveling unit 10B is included in an area within a predetermined distance from a user's current location and a user's destination and a purpose of a user riding on a cabin unit 10A connected to the traveling unit 10B is traveling. Based on information in the cabin unit information DB 312, the vehicle selector 303 avoids selecting a cabin unit 10A in which the number of users is equal to or larger than the predetermined number. The vehicle selector 303 may select a traveling unit 10B that satisfies conditions that a planned traveling route of the traveling unit 10B is included in an area within the predetermined distance from a user's current location and a user's destination and no other user is riding on a cabin unit 10A connected to the traveling unit 10B. The planned traveling route is generated by the command generator 304 described later based on a current location and a destination of the traveling unit 10B and map information stored in the map information DB 314 described later. The predetermined distance is a distance suitable for users who ride together. For example, the area within the predetermined distance is an area in the same district.

There may be no traveling unit 10B connected to the cabin unit 10A described above. In this case, the vehicle selector 303 selects a cabin unit 10A that is not connected to a traveling unit 10B, and a traveling unit 10B that is not connected to a cabin unit 10A. At this time, the vehicle selector 303 may select, for example, a cabin unit 10A and a traveling unit 10B whose current locations fall within a range of the predetermined distance from a user's current location.

When a plurality of traveling units 10B is selectable, the vehicle selector 303 may select, for example, a traveling unit 10B that travels a shortest distance from a current location of the traveling unit 10B to a user's current location, or may randomly select a traveling unit 10B whose traveling distance is equal to or shorter than a predetermined distance. The vehicle selector 303 may select a traveling unit 10B having a lowest cost.

When the user's purpose is exercise, the vehicle selector 303 selects, for example, a cabin unit 10A and a traveling unit 10B associated with exercise. The vehicle selector 303 selects the cabin unit 10A and the traveling unit 10B associated with exercise by accessing the user information DB 311, the cabin unit information DB 312, the traveling unit information DB 313, and the map information DB 314. The vehicle selector 303 selects a traveling unit 10B that satisfies conditions that a planned traveling route of the traveling unit 10B is included in an area within the predetermined distance from a user's current location and a user's destination and a purpose of a user riding on a cabin unit 10A connected to the traveling unit 10B is exercise. Based on information in the cabin unit information DB 312, the vehicle selector 303 avoids selecting a cabin unit 10A in which the number of users is equal to or larger than the predetermined number. The vehicle selector 303 may select a traveling unit 10B that satisfies conditions that a planned traveling route of the traveling unit 10B is included in an area within the predetermined distance from a user's current location and a user's destination and no other user is riding on a cabin unit 10A connected to the traveling unit 10B.

There may be no traveling unit 10B connected to the cabin unit 10A described above. In this case, the vehicle selector 303 selects a cabin unit 10A that is not connected to a traveling unit 10B, and a traveling unit 10B that is not connected to a cabin unit 10A. At this time, the vehicle selector 303 may select, for example, a cabin unit 10A and a traveling unit 10B whose current locations fall within a range of the predetermined distance from a user's current location.

When a plurality of traveling units 10B is selectable, the vehicle selector 303 may select, for example, a traveling unit 10B that travels a shortest distance from a current location of the traveling unit 10B to a user's current location, or may randomly select a traveling unit 10B whose traveling distance is equal to or shorter than a predetermined distance. The vehicle selector 303 may select a traveling unit 10B having a lowest cost.

The vehicle selector 303 inputs the number of users riding on the selected cabin unit 10A to the cabin unit information DB 312 described later. When the cabin unit 10A and the traveling unit 10B are combined, the vehicle selector 303 updates the cabin unit information DB 312 and the traveling unit information DB 313 described later so that the combination is distinguishable.

The command generator 304 generates a traveling command for causing a traveling unit 10B to travel. The command generator 304 generates the traveling command so that users having the same purpose ride together. The present disclosure is not limited to this case, but users having different purposes may ride together. For example, the traveling command contains a traveling route of the traveling unit 10B. For example, the command generator 304 generates the traveling command so that the traveling unit 10B departs from a current location (for example, a base), travels to a location of a cabin unit 10A for connection to the cabin unit 10A, and then travels to a user's destination. When a user's purpose is exercise, the command generator 304 generates the traveling command so that the cabin unit 10A is disconnected at the predetermined location. The command generator 304 may generate the traveling command so that the traveling unit 10B disconnected from the cabin unit 10A at the predetermined location returns to the base. Alternatively, the command generator 304 may generate the traveling command so that the traveling unit 10B disconnected from the cabin unit 10A at the predetermined location travels to a location of another cabin unit 10A. Still alternatively, the traveling unit 10B disconnected from the cabin unit 10A at the predetermined location may wait at the location until the command generator 304 generates a command for carrying another cabin unit 10A. The destination of the traveling unit 10B may be a predetermined destination instead of the user's destination irrespective of the user's purpose. That is, the origin and the destination of the traveling unit 10B may be determined in advance. The command generator 304 may generate the traveling command so that traveling units 10B travel at every predetermined time.

When the vehicle selector 303 selects a cabin unit 10A, the command generator 304 generates a traveling route of the traveling unit 10B again so that the traveling unit 10B travels through current locations and destinations of users of the cabin unit 10A. The traveling route is generated based on the current locations and the destinations of the users and the map information stored in the map information DB 314 described later. The traveling route is generated in accordance with a predetermined rule to obtain a route along which the traveling distance of the vehicle 10 is shortest or a route along which the traveling time of the vehicle 10 is shortest. The command generator 304 stores information related to the generated traveling route in the traveling unit information DB 313, and transmits the information to the traveling unit 10B.

The user information DB 311 is constructed such that the auxiliary memory 33 stores user information. For example, the user information contains information related to user IDs linked to users, users' current locations, users' destinations, and users' purposes. The structure of the user information stored in the user information DB 311 is described with reference to FIG. 4. FIG. 4 is a diagram illustrating an example of the table structure of the user information. A user information table has a user ID field, a current location field, a destination field, and a purpose field. Information for identifying a user or a user terminal 20 is input to the user ID field. Information related to a user's current location is input to the current location field. The user's current location may be an arbitrary location input to the user terminal 20 by the user, or a location based on a current location acquired from the user terminal 20. Information related to a user's destination is input to the destination field. Information related to a user's purpose is input to the purpose field. The pieces of information related to the user ID, the current location, the destination, and the purpose are contained in a use request transmitted from the user terminal 20.

The cabin unit information DB 312 is constructed such that the auxiliary memory 33 stores information related to cabin units 10A (hereinafter referred to also as "cabin unit information"). The structure of the cabin unit information stored in the cabin unit information DB 312 is described with reference to FIG. 5. FIG. 5 is a diagram illustrating an example of the table structure of the cabin unit information. A cabin unit information table has a cabin unit ID field, a positional information field, a purpose field, a user count field, and a traveling unit ID field. Identification information for identifying a cabin unit 10A is input to the cabin unit ID field. Positional information of the cabin unit 10A is input to the positional information field. The positional information indicates a current location of the cabin unit 10A. When the cabin unit 10A is disconnected from the traveling unit 10B, the current location of the cabin unit 10A may be fixed until the cabin unit 10A is connected to the traveling unit 10B next time. Information indicating a purpose of use of the cabin unit 10A is input to the purpose field. The purpose associated with each cabin unit 10A may be determined depending on a purpose of a user who uses the cabin unit 10A first, or may be determined in advance. Information related to the number of users of the cabin unit 10A is input to the user count field. The number of users includes the number of users riding on the cabin unit 10A and the number of users expected to ride on the cabin unit 10A. When the vehicle selector 303 selects a cabin unit 10A associated with a user, the vehicle selector 303 adds 1 to the user count field associated with the cabin unit 10A in the cabin unit information DB 312. Identification information for identifying a traveling unit 10B connected to the cabin unit 10A is input to the traveling unit ID field. When no traveling unit 10B is connected to the cabin unit 10A, the traveling unit ID field is left blank. When the vehicle selector 303 newly combines a cabin unit 10A and a traveling unit 10B, the vehicle selector 303 updates a traveling unit ID associated with the cabin unit 10A in the cabin unit information DB 312.

The traveling unit information DB 313 is constructed such that the auxiliary memory 33 stores information related to traveling units 10B (hereinafter referred to also as "traveling unit information"). The structure of the traveling unit information stored in the traveling unit information DB 313 is described with reference to FIG. 6. FIG. 6 is a diagram illustrating an example of the table structure of the traveling unit information. A traveling unit information table has a traveling unit ID field, a positional information field, a destination field, a traveling route field, and a cabin unit ID field. Information for identifying a traveling unit 10B is input to the traveling unit ID field. Positional information of the traveling unit 10B is input to the positional information field. The positional information indicates a current location of the traveling unit 10B. Information related to a destination of the traveling unit 10B is input to the destination field. The destination of the traveling unit 10B is a final destination of the traveling unit 10B. The destination of a traveling unit 10B connected to a cabin unit 10A where users are riding for the purpose of exercise is the predetermined location. The destination of a traveling unit 10B connected to a cabin unit 10A where users are riding for the purpose of traveling may be a destination of any user riding on the cabin unit 10A, or may be determined in advance. Information related to a planned traveling route of the traveling unit 10B is input to the traveling route field. The planned traveling route is generated by the command generator 304. A cabin unit ID of a cabin unit 10A connected to the traveling unit 10B is input to the cabin unit ID field. When no cabin unit 10A is connected to the traveling unit 10B, the cabin unit ID field is left blank. When the vehicle selector 303 newly combines a cabin unit 10A and a traveling unit 10B, the vehicle selector 303 updates a cabin unit ID associated with the traveling unit 10B in the traveling unit information DB 313.

The map information DB 314 stores map information containing map data and information on points of interest (POIs) such as texts and pictures representing features of individual points on the map data. The map information DB 314 may be provided by other systems connected to the network N1, such as a geographic information system (GIS).

Functional Configuration: Traveling Unit

FIG. 7 is a diagram illustrating an example of the functional configuration of the traveling unit 10B. The traveling unit 10B includes, as functional elements, a traveling plan generator 101, an environment detector 102, a traveling controller 103, a positional information transmitter 104, and a cabin unit manager 105. For example, the traveling plan generator 101, the environment detector 102, the traveling controller 103, the positional information transmitter 104, and the cabin unit manager 105 are functional elements provided such that the processor 11B of the traveling unit 10B executes various programs stored in the auxiliary memory 13B.

The traveling plan generator 101 acquires a traveling command from the server 30, and generates a traveling plan of the traveling unit 10B. The traveling command contains information related to a traveling route of the traveling unit 10B. Based on the traveling command supplied from the server 30, the traveling plan generator 101 calculates a route of the traveling unit 10B, and generates a traveling plan to travel along the route.

The environment detector 102 detects an environment around the traveling unit 10B based on data acquired by the environmental information sensor 18B. The environment is necessary for autonomous traveling. Examples of the detection target include the number of lanes, positions of the lanes, the number of other mobile objects around the traveling unit 10B, positions of the other mobile objects, the number of obstacles around the traveling unit 10B (for example, a pedestrian, a bicycle, a structure, and a building), positions of the obstacles, structures of roads, and traffic signs. The present disclosure is not limited to those detection targets. Any detection target may be possible as long as the detection target is necessary for autonomous traveling. For example, when the environmental information sensor 18B is a stereoscopic camera, objects around the traveling unit 10B are detected by processing image data obtained by the stereoscopic camera. Data related to the environment around the traveling unit 10B that is detected by the environment detector 102 (hereinafter referred to as "environmental data") is transmitted to the traveling controller 103 described later.

The traveling controller 103 generates a control command for controlling autonomous traveling of the traveling unit 10B based on the traveling plan generated by the traveling plan generator 101, the environmental data generated by the environment detector 102, and positional information of the traveling unit 10B, which is acquired by the positional information sensor 17B. For example, the traveling controller 103 generates the control command so that the traveling unit 10B travels along a predetermined route and no obstacle enters a predetermined safety area around the traveling unit 10B. The generated control command is transmitted to the drive unit 19B. A publicly known method may be employed as the method for generating the control command for causing the traveling unit 10B to travel autonomously.

The positional information transmitter 104 transmits the positional information acquired from the positional information sensor 17B to the server 30 via the communicator 16B. The positional information transmitter 104 may transmit the positional information at a timing set as appropriate. For example, the positional information transmitter 104 may transmit the positional information periodically, in synchronization with a timing when any information is transmitted to the server 30, or in response to a request from the server 30. The positional information transmitter 104 transmits the positional information to the server 30 together with a traveling unit ID.

The cabin unit manager 105 generates a command related to connection and disconnection of the cabin unit 10A and the traveling unit 10B. This command includes a command for causing the connection device 14B to perform an operation of connecting the cabin unit 10A to the traveling unit 10B, and a command for causing the connection device 14B to perform an operation of disconnecting the cabin unit 10A from the traveling unit 10B.

Functional Configuration: User Terminal

FIG. 8 is a diagram illustrating an example of the functional configuration of the user terminal 20. The user terminal 20 includes an information transceiver 201 as a functional element. For example, the information transceiver 201 is a functional element provided such that the processor 21 of the user terminal 20 executes various programs stored in the auxiliary memory 23. For example, the information transceiver 201 controls transmission of information to the server 30 or reception of information from the server 30. For example, the information transceiver 201 generates a use request when the user performs an action to use a cabin unit 10A. For example, the information transceiver 201 outputs, to the touch panel display of the user terminal 20, an icon for a request to use a cabin unit 10A, and generates a use request when the user clicks the icon. The use request contains user's positional information. The user's positional information may be obtained by the positional information sensor 27, or may be input via the input unit 24 by the user. The information transceiver 201 transmits the generated use request to the server 30 in association with the user ID.

For example, the information transceiver 201 generates a leaving request when the user performs an action for a request to leave a cabin unit 10A. For example, the information transceiver 201 outputs, to the touch panel display of the user terminal 20, an icon for a request to leave a cabin unit 10A, and generates a leaving request when the user clicks the icon. The information transceiver 201 transmits the generated leaving request to the server 30 in association with the user ID.

Processing Flow: Server

Figure 9:
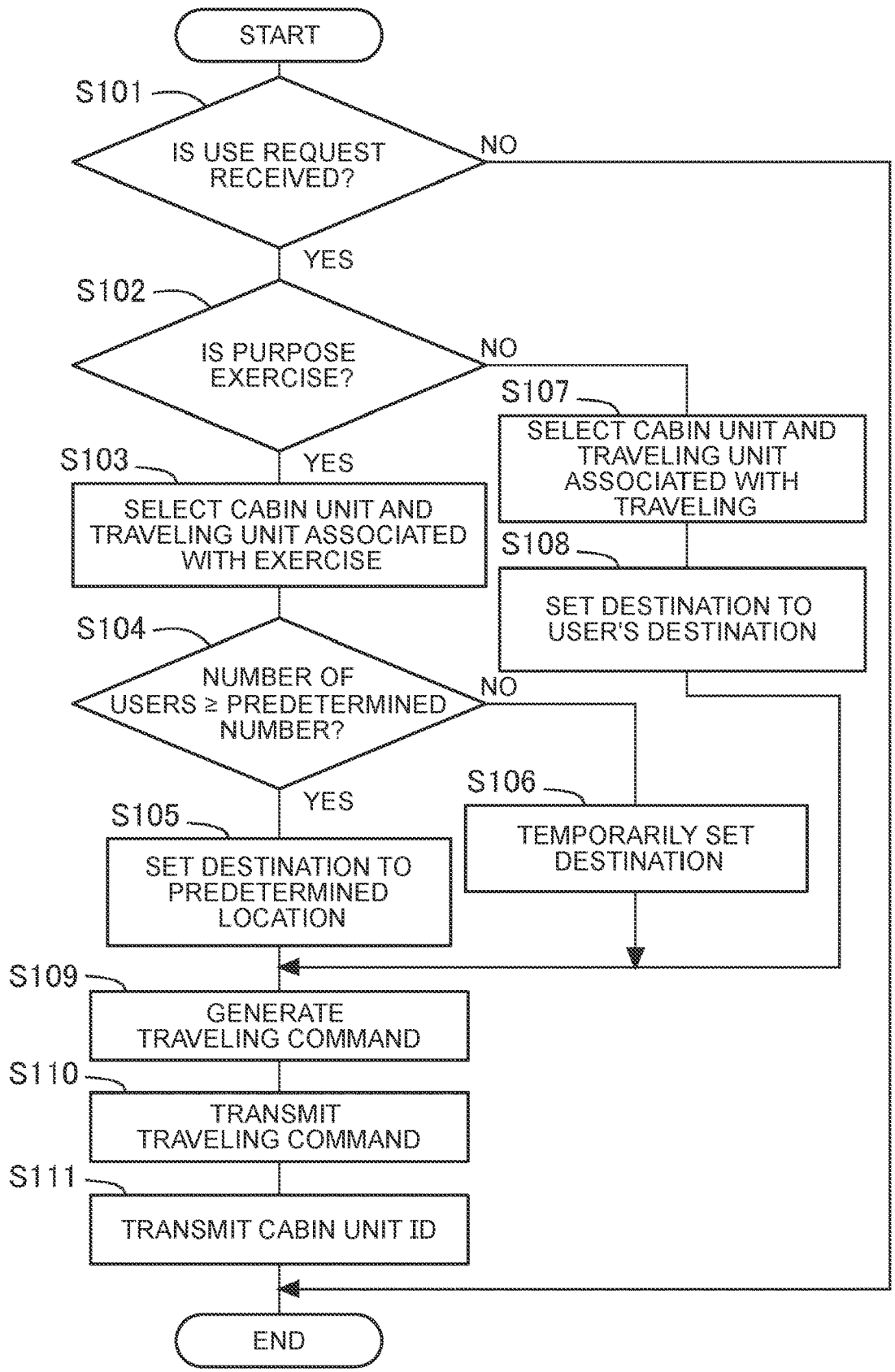
FIG. 9 is an example of a flowchart of a process to be executed by the server according to the embodiment.

Next, a process to be executed by the server 30 is described. FIG. 9 is an example of a flowchart of the process to be executed by the server 30 according to this embodiment. The process illustrated in FIG. 9 is executed at every predetermined timing by the processor 31 of the server 30. The server 30 has already received information necessary to construct the cabin unit information DB 312 and the traveling unit information DB 313.

In Step S101, the request acquirer 301 determines whether a use request is received from a user terminal 20. The use request contains information related to a current location of a user of a cabin unit 10A, information related to a user's destination, and information related to a user's purpose. When the use request is received, the request acquirer 301 stores the pieces of information contained in the use request in the user information DB 311, and gives a positive determination result in Step S101. When the positive determination result is given in Step S101, the process proceeds to Step S102. When a negative determination result is given in Step S101, this routine is terminated.

In Step S102, the vehicle selector 303 determines whether the user's purpose is exercise. This user is related to the use request received in Step S101. The vehicle selector 303 determines whether the user's purpose is exercise based on the information in the user information DB 311. When a positive determination result is given in Step S102, the process proceeds to Step S103. When a negative determination result is given in Step S102, the process proceeds to Step S107.

In Step S103, the vehicle selector 303 selects a cabin unit 10A and a traveling unit 10B associated with exercise. The vehicle selector 303 selects the cabin unit 10A and the traveling unit 10B associated with exercise by accessing the user information DB 311, the cabin unit information DB 312, the traveling unit information DB 313, and the map information DB 314. The vehicle selector 303 selects a traveling unit 10B that satisfies conditions that a planned traveling route of the traveling unit 10B is included in an area within the predetermined distance from the user's current location and the user's destination and a purpose of a user riding on a cabin unit 10A connected to the traveling unit 10B is exercise. Based on the information in the cabin unit information DB 312, the vehicle selector 303 avoids selecting a cabin unit 10A in which the number of users is equal to or larger than the predetermined number. Alternatively, the vehicle selector 303 selects a traveling unit 10B that satisfies conditions that a planned traveling route of the traveling unit 10B is included in an area within the predetermined distance from the user's current location and the user's destination and no other user is riding on a cabin unit 10A connected to the traveling unit 10B. In Step S103, the vehicle selector 303 selects a cabin unit 10A where no second user is riding. The present disclosure is not limited to this case, but the vehicle selector 303 may select a cabin unit 10A where a second user is riding.

The vehicle selector 303 adds 1 to a user count field associated with the cabin unit 10A in the cabin unit information DB 312. When a cabin unit 10A and a traveling unit 10B are newly combined in Step S103, the vehicle selector 303 inputs a traveling unit ID associated with the cabin unit 10A in the cabin unit information DB 312, and a cabin unit ID associated with the traveling unit 10B in the traveling unit information DB 313.

In Step S104, the vehicle selector 303 determines whether the number of users who ride on the cabin unit 10A selected in Step S103 is equal to or larger than the predetermined number. For example, the predetermined number is a number corresponding to the capacity of the cabin unit 10A, or may be determined in advance for each cabin unit 10A. The vehicle selector 303 acquires the number of users who ride on the cabin unit 10A by accessing the cabin unit information DB 312. The number of users is a total of the number of users riding on the cabin unit 10A and the number of users expected to ride on the cabin unit 10A. When the cabin unit 10A is not connected to a traveling unit 10B, one user related to this routine is expected to ride on the cabin unit 10A. When a positive determination result is given in Step S104, the process proceeds to Step S105. When a negative determination result is given in Step S104, the process proceeds to Step S106.

In Step S105, the vehicle manager 302 sets a final destination of the traveling unit 10B to the predetermined location. That is, the vehicle manager 302 sets the predetermined location as the final destination to place the cabin unit 10A at the predetermined location. The vehicle manager 302 updates a destination associated with the traveling unit 10B in the traveling unit information DB 313.

In Step S106, the vehicle manager 302 temporarily sets the final destination of the traveling unit 10B. The temporary destination is set so that the traveling unit 10B continues to travel until the number of users riding on the cabin unit 10A is equal to or larger than the predetermined number. For example, the vehicle manager 302 may set destinations so that the traveling unit 10B travels in a loop along a predetermined route. The vehicle manager 302 updates the destination associated with the traveling unit 10B in the traveling unit information DB 313.

In Step S107, the vehicle selector 303 selects a cabin unit 10A and a traveling unit 10B associated with traveling. The vehicle selector 303 selects the cabin unit 10A and the traveling unit 10B associated with traveling by accessing the user information DB 311, the cabin unit information DB 312, the traveling unit information DB 313, and the map information DB 314. In Step S107, the vehicle selector 303 selects a cabin unit 10A where no first user is riding. The present disclosure is not limited to this case, but the vehicle selector 303 may select a cabin unit 10A where a first user is riding.

When the cabin unit 10A is selected in Step S107, the vehicle selector 303 adds 1 to a user count field associated with the cabin unit 10A in the cabin unit information DB 312. When a cabin unit 10A and a traveling unit 10B are newly combined in Step S107, the vehicle selector 303 inputs a traveling unit ID associated with the cabin unit 10A in the cabin unit information DB 312, and a cabin unit ID associated with the traveling unit 10B in the traveling unit information DB 313.

In Step S108, the vehicle manager 302 sets a final destination of the traveling unit 10B to a destination of any user. In this case, the final destination of the traveling unit 10B may be a user's destination farthest from a current location of the traveling unit 10B. When the final destination is determined in advance, this final destination is set. The vehicle manager 302 updates a destination associated with the traveling unit 10B in the traveling unit information DB 313.

In Step S109, the command generator 304 generates a traveling command containing a traveling route. The command generator 304 generates the traveling route of the traveling unit 10B so that the traveling unit 10B travels through the current location of the traveling unit 10B, the final destination, users' current locations, and users' destinations. When the cabin unit 10A is not connected to the traveling unit 10B, the traveling route is generated so that the traveling unit 10B travels first through a current location of the cabin unit 10A from the current location of the traveling unit 10B. The traveling route is generated based on the current location of the traveling unit 10B, the final destination, the users' current locations, the users' destinations, and the map information stored in the map information DB 314. The traveling route is generated in accordance with the predetermined rule. For example, the traveling command may contain, in addition to the traveling route of the traveling unit 10B, a command for connecting the cabin unit 10A to the traveling unit 10B at the current location of the cabin unit 10A, and a command for allowing each user to ride on or leave the cabin unit 10A at stopover locations.

When a cabin unit 10A and a traveling unit 10B are newly combined in Step S103 or Step S107, the traveling command generated in Step S109 contains a command for connecting the cabin unit 10A at a current location of the cabin unit 10A (hereinafter referred to also as "connection command"). When the destination is set to the predetermined location in Step S105, the traveling command generated in Step S109 contains a command for disconnecting the cabin unit 10A at the predetermined location (hereinafter referred to also as "disconnection command").

When the traveling route is generated in Step S109, the command generator 304 updates a traveling route associated with the traveling unit 10B in the traveling unit information DB 313. In Step S110, the command generator 304 transmits the traveling command containing the generated traveling route to the traveling unit 10B. In Step S111, the command generator 304 transmits the cabin unit ID associated with the allocated cabin unit 10A to the user terminal 20 that transmits the use request. The user can view, on the user terminal 20, the cabin unit ID of the cabin unit 10A where the user will ride.

Processing Flow: Traveling Unit

Figure 10:
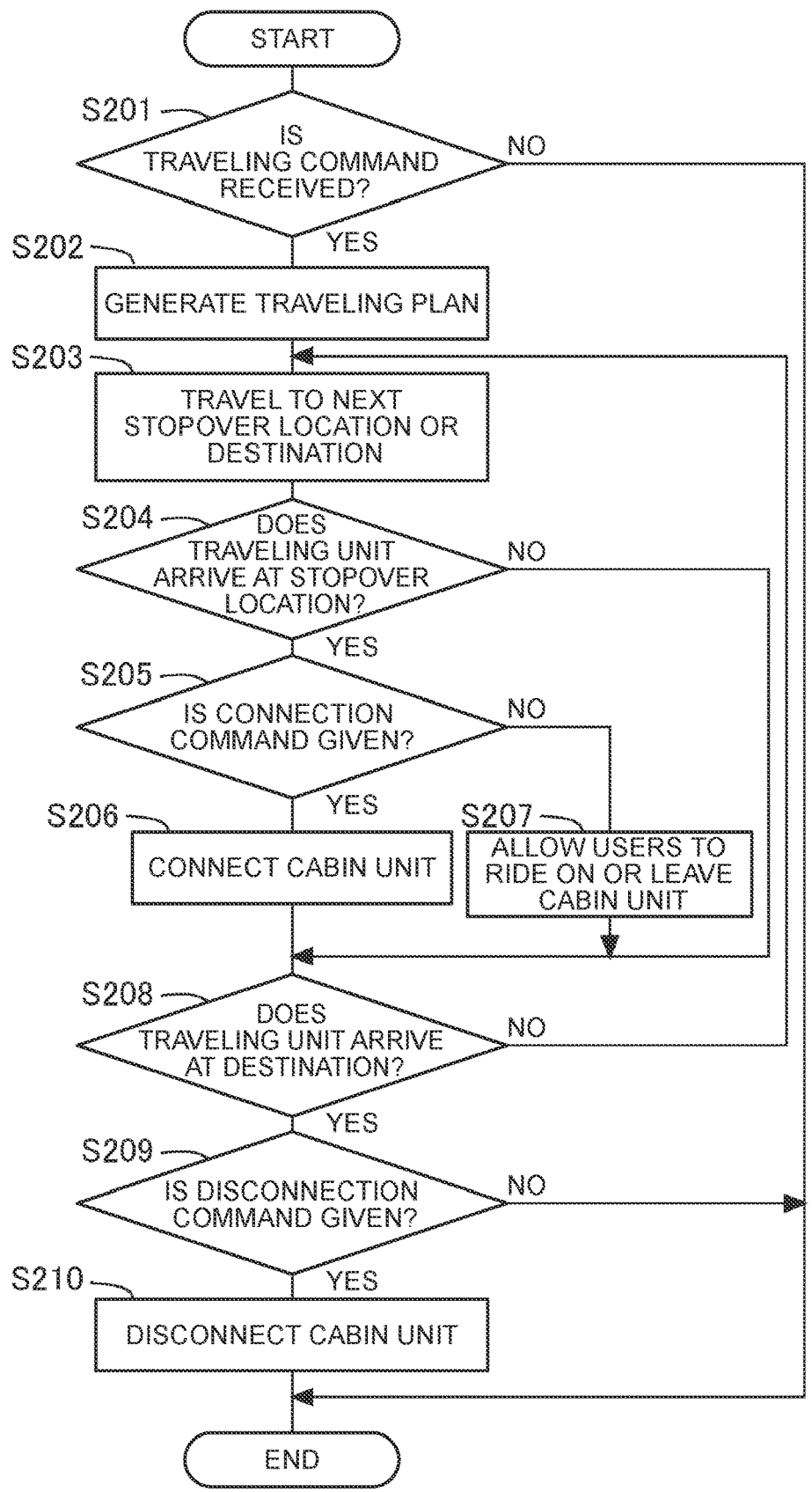
FIG. 10 is an example of a flowchart of a process to be executed by the traveling unit according to the embodiment.

Next, a process to be executed by the traveling unit 10B is described. FIG. 10 is an example of a flowchart of the process to be executed by the traveling unit 10B according to this embodiment. The process illustrated in FIG. 10 is executed at every predetermined timing by the processor 11B of the traveling unit 10B. The process in this flowchart is executed in a standby traveling unit 10B.

In Step S201, the traveling plan generator 101 determines whether a traveling command is received from the server 30. When a positive determination result is given in Step S201, the process proceeds to Step S202. When a negative determination result is given in Step S201, this routine is terminated. In Step S202, the traveling plan generator 101 generates a traveling plan based on the traveling command. The traveling plan contains a plan to travel to stopover locations and a destination.

When the traveling plan is generated, the traveling controller 103 generates a control command in Step S203. The drive unit 19B is controlled based on the control command, and the traveling unit 10B travels to a next stopover location. After the traveling unit 10B travels through all the stopover locations, the traveling unit 10B travels to the destination. The stopover locations include a location where a cabin unit 10A is connected, and locations where users ride on or leave the cabin unit 10A.

In Step S204, the traveling controller 103 determines whether the traveling unit 10B arrives at a stopover location. For example, the traveling controller 103 determines whether the traveling unit 10B arrives at the stopover location by comparing positional information acquired by the positional information sensor 17B and positional information of the stopover location that is acquired from the server 30. When a positive determination result is given in Step S204, the process proceeds to Step S205. When a negative determination result is given in Step S204, the process proceeds to Step S208.

In Step S205, the cabin unit manager 105 determines whether a connection command associated with the stopover location is given. For example, the cabin unit manager 105 determines whether the connection command associated with the stopover location is given by comparing the positional information of the traveling unit 10B and a current location of a cabin unit 10A related to the connection command acquired from the server 30. When the connection command is given, the cabin unit 10A is placed at the stopover location. When a positive determination result is given in Step S205, the process proceeds to Step S206. When a negative determination result is given in Step S205, the process proceeds to Step S207.

In Step S206, the cabin unit manager 105 controls the connection device 14B to connect the cabin unit 10A and the traveling unit 10B. The cabin unit 10A is selected by the server 30. For example, the traveling command from the server 30 contains a cabin unit ID, and the traveling unit 10B distinguishes the cabin unit 10A based on the cabin unit ID. For example, the traveling unit 10B may identify the cabin unit 10A by reading the cabin unit ID displayed on the cabin unit 10A by the environmental information sensor 18B, or may identify the cabin unit 10A by communicating with the cabin unit 10A.

In Step S207, the traveling controller 103 performs control for allowing the users to ride on or leave the cabin unit 10A. For example, the traveling controller 103 stops the traveling unit 10B at the stopover location, and unlocks, opens, closes, and locks the door.

In Step S208, the traveling controller 103 determines whether the traveling unit 10B arrives at the final destination. The traveling controller 103 determines whether the traveling unit 10B arrives at the final destination by comparing the positional information of the traveling unit 10B and positional information of the final destination that is acquired from the server 30. When a positive determination result is given in Step S208, the process proceeds to Step S209. When a negative determination result is given in Step S208, the process returns to Step S203, and the traveling of the traveling unit 10B is controlled continuously.

In Step S209, the cabin unit manager 105 determines whether a disconnection command associated with the destination is given. The disconnection command is contained in the traveling command received from the server 30. When the disconnection command is given, the cabin unit 10A is disconnected at the destination. That is, when a positive determination result is given in Step S209, the process proceeds to Step S210, and the cabin unit manager 105 controls the connection device 14B to disconnect the cabin unit 10A from the traveling unit 10B. When a negative determination result is given in Step S209, this routine is terminated.

When the traveling unit 10B arrives at the destination, the server 30 determines that the traveling unit 10B arrives at the destination based on, for example, the positional information of the traveling unit 10B. The server 30 generates a subsequent traveling command, and transmits the traveling command to the traveling unit 10B.

Processing Flow: User Terminal

Figure 11:
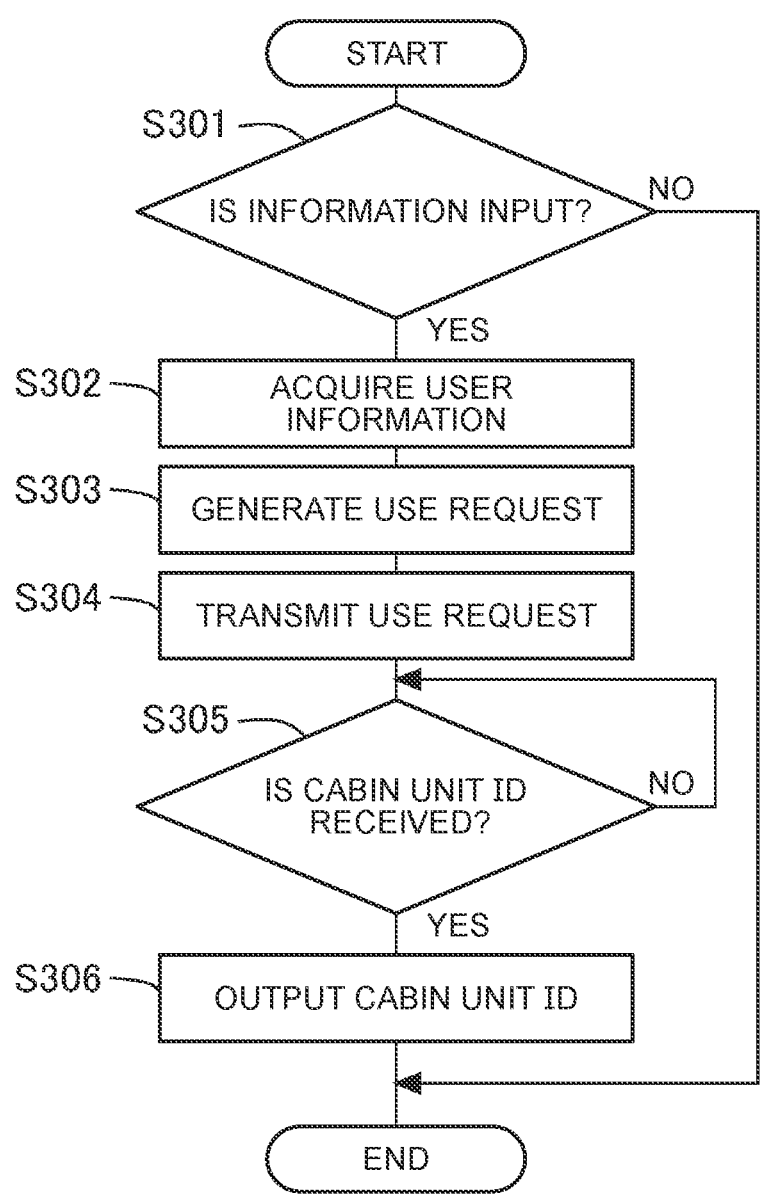
FIG. 11 is an example of a flowchart of a process for transmitting a use request from the user terminal according to the embodiment.

Next, a process for transmitting a use request from the user terminal 20 is described. FIG. 11 is an example of a flowchart of the process for transmitting a use request from the user terminal 20 according to this embodiment. The process illustrated in FIG. 11 is executed at every predetermined timing by the processor 21 of the user terminal 20.

In Step S301, the information transceiver 201 determines whether information related to the use of a cabin unit 10A is input via the input unit 24. For example, the information transceiver 201 determines that the information related to the use of the cabin unit 10A is input when the user clicks an icon output to the output unit 25 for transmission of a use request. For example, the icon for transmission of a use request is displayed on the touch panel display, and the information transceiver 201 determines whether the user clicks the icon. The timing to transmit a use request is not limited to the timing when the icon is clicked. When a positive determination result is given in Step S301, the process proceeds to Step S302. When a negative determination result is given in Step S301, this routine is terminated.

Figures 12, 13:
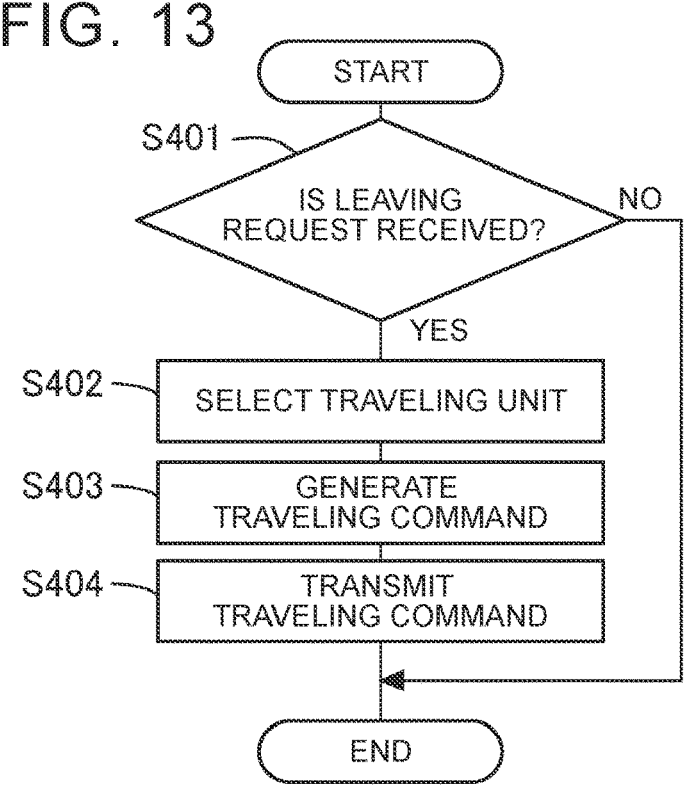
FIG. 12 is a diagram illustrating an example of a screen to be displayed on an output unit of the user terminal and used for inputting a user ID, a destination, and a purpose.
FIG. 13 is an example of a flowchart of a process for transmitting a traveling command to the traveling unit from the server according to the embodiment.

In Step S302, the information transceiver 201 acquires user information. The information transceiver 201 acquires positional information of the user terminal 20 based on the positional information sensor 27. The information transceiver 201 displays, on the output unit 25, a screen that prompts the user to input a user ID, a destination, and a purpose. FIG. 12 is a diagram illustrating an example of the screen to be displayed on the output unit 25 of the user terminal 20 and used for inputting the user ID, the destination, and the purpose. The user inputs texts for the user ID and the destination. The user ID may be preset as a value unique to the user terminal 20. An address or the name of a facility may be input as the destination. A plurality of preset locations may be displayed and the user may select the destination from among the displayed locations. When the purpose is exercise, the destination need not be input. The user selects traveling or exercise as the purpose by pushing a button icon prepared in advance. In Step S303, the information transceiver 201 generates a use request. In Step S304, the information transceiver 201 transmits the use request to the server 30.

In Step S305, the information transceiver 201 determines whether a cabin unit ID is received from the server 30. The cabin unit ID to be received is associated with a cabin unit 10A to be used by the user. When a positive determination result is given in Step S305, the process proceeds to Step S306. When a negative determination result is given in Step S305, Step S305 is executed again. In Step S306, the information transceiver 201 outputs the cabin unit ID to the output unit 25. Thus, the user can grasp the cabin unit 10A where the user will ride.

The cabin unit 10A placed at the predetermined location may be connected to a traveling unit 10B after an elapse of a predetermined time, and the traveling unit 10B may return to riding locations of users riding on the cabin unit 10A so that the users leave the cabin unit 10A. For example, when information related to leaving is transmitted from any user terminal 20, the cabin unit 10A may be moved to the user's riding location by allocating a traveling unit 10B for carrying the cabin unit 10A. When one user has left the cabin unit 10A, the number of users riding on the cabin unit 10A is smaller than the predetermined number. Therefore, the traveling unit 10B may carry the cabin unit 10A until another user rides on the cabin unit 10A.

Next, description is given of a process to be executed when a user wants to leave a cabin unit 10A. This cabin unit 10A is provided for exercise. When the user wants to leave the cabin unit 10A, the user inputs, to his/her user terminal 20 via the input unit 24, information indicating that the user wants to leave the cabin unit 10A. Then, the user terminal 20 generates a leaving request.

When the leaving request is received from the user terminal 20, the server 30 selects a traveling unit 10B for carrying the cabin unit 10A. For example, this traveling unit 10B is located at a distance equal to or shorter than a predetermined distance from the cabin unit 10A. In this embodiment, the predetermined distance may be a distance at which the cost for carrying the cabin unit 10A falls within a permissible range.

The server 30 that selects the traveling unit 10B for carrying the cabin unit 10A generates a command for the traveling unit 10B. This command contains a command for traveling to the predetermined location where the cabin unit 10A is placed, a command for connecting the cabin unit 10A to the traveling unit 10B, and a command for carrying the cabin unit 10A to a user's leaving location. The user's leaving location may be the same as a user's riding location, or a location desired by the user. The server 30 that generates the command transmits the command to the selected traveling unit 10B. The traveling unit 10B that receives the command autonomously travels based on the command.

Processing Flow: Server

Next, description is given of a process for transmitting, from the server 30, a traveling command for carrying a cabin unit 10A when the server 30 receives a leaving request. FIG.

13 is an example of a flowchart of the process for transmitting the traveling command to a traveling unit 10B from the server 30 according to this embodiment. The process illustrated in FIG. 13 is executed at every predetermined timing by the processor 31 of the server 30. The server 30 has already received information necessary to construct the user information DB 311, the cabin unit information DB 312, the traveling unit information DB 313, and the map information DB 314.

In Step S401, the request acquirer 301 determines whether a leaving request is received from a user terminal 20. When a positive determination result is given in Step S401, the process proceeds to Step S402. When a negative determination result is given in Step S401, this routine is terminated.

In Step S402, the vehicle selector 303 selects a traveling unit 10B for carrying a cabin unit 10A that a user wants to leave. For example, the vehicle selector 303 accesses the traveling unit information DB 313 and the map information DB 314 to select, from among traveling units 10B having cabin unit IDs left blank, a traveling unit 10B closest to the cabin unit 10A for which the leaving request is received in Step S401, or a traveling unit 10B whose traveling distance is equal to or shorter than a predetermined distance from a current location of the traveling unit 10B to a current location of the cabin unit 10A. The vehicle selector 303 inputs an associated cabin unit ID to a cabin unit ID field of the selected traveling unit 10B in the traveling unit information DB 313. The vehicle selector 303 inputs an associated traveling unit ID to a traveling unit ID field of the cabin unit 10A in the cabin unit information DB 312.

In Step S403, the command generator 304 generates a traveling command to be transmitted to the traveling unit 10B. The command generator 304 generates a traveling command containing a command for causing the traveling unit 10B to travel from the current location of the traveling unit 10B to the current location of the cabin unit 10A, a command for connecting the cabin unit 10A at the current location of the cabin unit 10A, and a command for causing the traveling unit 10B to travel from the current location of the cabin unit 10A to a user's leaving location. The traveling command may contain a command for causing the traveling unit 10B to travel to the temporary destination described above after the user leaves the cabin unit 10A. When the traveling command is generated, the process proceeds to Step S404, and the command generator 304 transmits the traveling command to the traveling unit 10B.

Processing Flow: Traveling Unit

Figure 14:
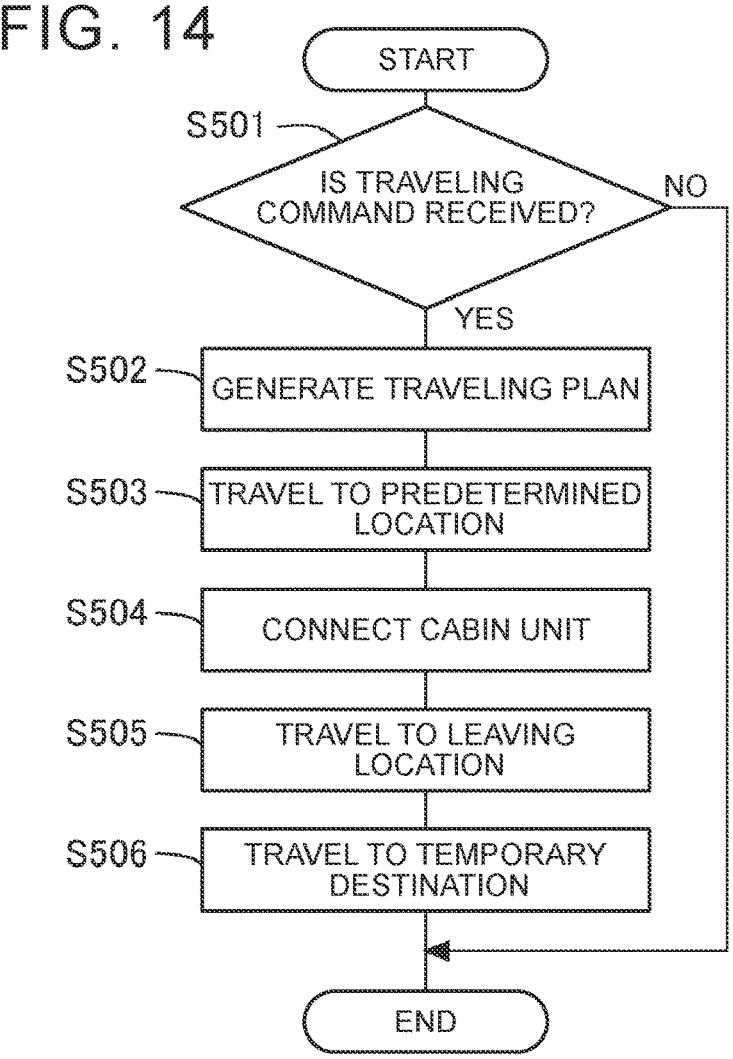
FIG. 14 is an example of a flowchart of a process for causing the traveling unit to travel when carrying the cabin unit according to the embodiment.

Next, description is given of a process for causing the traveling unit 10B to travel when carrying a cabin unit 10A related to a leaving request. FIG. 14 is an example of a flowchart of the process for causing the traveling unit 10B to travel when carrying the cabin unit 10A according to this embodiment. The process illustrated in FIG. 14 is executed at every predetermined timing by the processor 11B of the traveling unit 10B. The process in this flowchart is executed in a traveling unit 10B that is not connected to the cabin unit 10A (that is, a traveling unit 10B having a cabin unit ID left blank in the traveling unit information DB 313).

In Step S501, the traveling plan generator 101 determines whether a traveling command is received from the server 30. When a positive determination result is given in Step S501, the process proceeds to Step S502. When a negative determination result is given in Step S501, this routine is terminated. In Step S502, the traveling plan generator 101 generates a traveling plan based on the traveling command.

When the traveling plan is generated, the traveling controller 103 generates a control command in Step S503. The drive unit 19B is controlled based on the control command, and the traveling unit 10B travels to the predetermined location. A cabin unit 10A that a user wants to leave is placed at the predetermined location. When the traveling unit 10B arrives at the predetermined location, the process proceeds to Step S504, and the cabin unit manager 105 controls the connection device 14B to connect the cabin unit 10A to the traveling unit 10B. A cabin unit ID of the cabin unit 10A is contained in the traveling command from the server 30, and the traveling unit 10B distinguishes the cabin unit 10A based on the cabin unit ID.

When the cabin unit 10A is connected, the process proceeds to Step S505, and the traveling controller 103 generates a control command. The drive unit 19B is controlled based on the control command, and the traveling unit 10B travels to a user's leaving location. For example, the leaving location is a location where the user inputs information to his/her user terminal 20, or a location where the user rides on the cabin unit 10A. In Step S506, the traveling controller 103 generates a control command. The drive unit 19B is controlled based on the control command, and the traveling unit 10B travels to a temporary destination. After Step S506, the process may proceed to the process in the flowchart illustrated in FIG. 9.

Processing Flow: User Terminal

Figure 15:
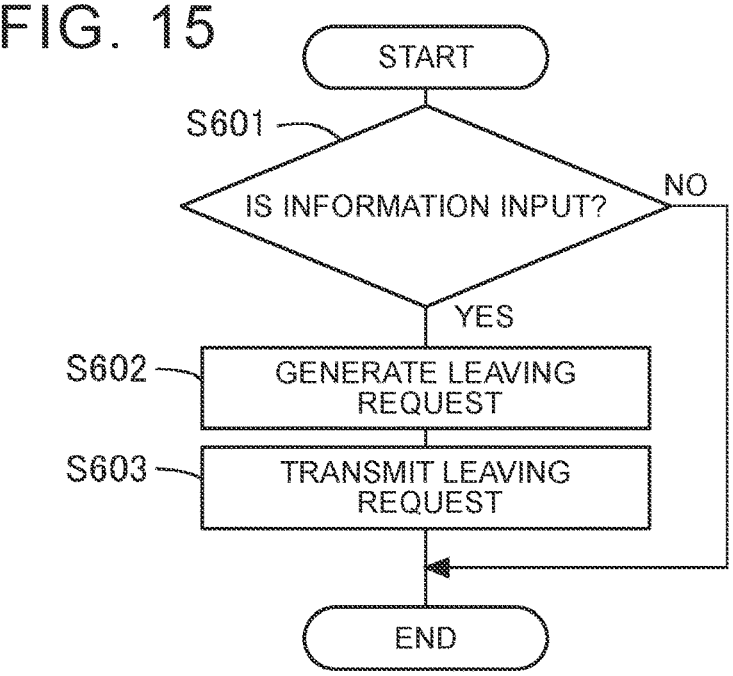
FIG. 15 is an example of a flowchart of a process for transmitting a leaving request from the user terminal according to the embodiment.

Next, description is given of a process for transmitting a leaving request from the user terminal 20. FIG. 15 is an example of a flowchart of the process for transmitting a leaving request from the user terminal 20 according to this embodiment. The process illustrated in FIG. 15 is executed at every predetermined timing by the processor 21 of the user terminal 20. The process in this flowchart is executed in a user terminal 20 after a use request is transmitted.

In Step S601, the information transceiver 201 determines whether information related to leaving from a cabin unit 10A is input via the input unit 24. For example, the information transceiver 201 determines that the information related to leaving from the cabin unit 10A is input when the user clicks an icon output to the output unit 25 for transmission of a leaving request. For example, the icon for transmission of a leaving request is displayed on the touch panel display, and the information transceiver 201 determines whether the user clicks the icon. The timing to transmit a leaving request is not limited to the timing when the icon is clicked. When a positive determination result is given in Step S601, the process proceeds to Step S602. When a negative determination result is given in Step S601, this routine is terminated. In Step S602, the information transceiver 201 generates a leaving request. The leaving request contains a user ID and information indicating that the user will leave the cabin unit 10A. In Step S603, the information transceiver 201 transmits the leaving request to the server 30.

According to this embodiment described above, a user can be provided with a vehicle 10 depending on a user's purpose. When the user's purpose is an activity in a cabin unit 10A instead of traveling, a cabin unit 10A where a predetermined number of users or more is riding is disconnected from a traveling unit 10B and placed at the predetermined location. Therefore, the traveling unit 10B can carry another cabin unit 10A. Thus, more cabin units 10A can be carried by a few traveling units 10B. Accordingly, the efficiency of use of the traveling units 10B can be increased.

Other Embodiments

The embodiment described above is only an example, and the present disclosure may be modified as appropriate without departing from the spirit of the present disclosure.

The processes and methods described in the present disclosure may freely be combined without causing any technical contradiction.

The process described as being executed by a single device may be executed by a plurality of devices in cooperation. Alternatively, the process described as being executed by different devices may be executed by a single device. In the computer system, the hardware configuration (server configuration) that implements functions may be changed flexibly. In the embodiment described above, the server 30 includes, as functional elements, the request acquirer 301, the vehicle manager 302, the vehicle selector 303, the command generator 304, the user information DB 311, the cabin unit information DB 312, the traveling unit information DB 313, and the map information DB 314, but the functional elements may partially or entirely be included in the cabin unit 10A, the traveling unit 10B, or the user terminal 20.

In the embodiment described above, the leaving request is transmitted from the user terminal 20, but may be transmitted from the cabin unit 10A. Therefore, the cabin unit 10A may include an input unit. A user who has finished using the cabin unit 10A may leave the cabin unit 10A at the predetermined location. In this case, the cabin unit 10A may include, for example, a sensor configured to detect that the user leaves the cabin unit 10A. When the sensor detects that the user leaves the cabin unit 10A, the traveling unit 10B may be connected to the cabin unit 10A, and the server 30 may generate a traveling command so that another user rides on the cabin unit 10A.

A user who intends traveling may use the exercise equipment in the cabin unit 10A while traveling to the destination. When the user can take exercise for a short time during traveling, the user's convenience can be improved.

The activity in the cabin unit 10A is not limited to exercise in the embodiment described above. The activity in the cabin unit 10A also includes an activity that does not require equipment. For example, when the user's purpose is reading, the predetermined location may be set to a silent location suitable for reading. The activity in the cabin unit 10A also includes user's inactivity such as sleeping, and a passive activity. Examples of the passive activity include massage and treatment. A plurality of types of cabin unit 10A may be set for a plurality of activities, and a traveling command may be generated so that users having the same purpose ride on a cabin unit 10A associated with the users.

The present disclosure may be embodied such that a computer program that implements the functions described in the embodiments described above is supplied to a computer and is read and executed by one or more processors of the computer. The computer program may be provided to the computer by being stored in a non-transitory computer readable storage medium connectable to a system bus of the computer, or may be provided to the computer via a network. Examples of the non-transitory computer readable storage medium include any types of disk or disc such as magnetic disks (for example, a floppy (registered trademark) disk and a hard disk drive (HDD)) and optical discs (for example, a compact disc ROM (CD-ROM), a digital versatile disc (DVD), and a Blu-ray disc), and any types of medium suitable to store electronic instructions, such as a read only memory (ROM), a random access memory (RAM), an EPROM, an electrically erasable programmable ROM (EEPROM), a magnetic card, a flash memory, and an optical card.

What is claimed is:

1. An information processing device comprising a controller configured to:
    generate, when information related to a request to use a cabin unit is acquired from a terminal of a first user who intends an activity in the cabin unit rather than traveling by the cabin unit, a command for causing a traveling unit to pick up the first user, the traveling unit being connected to a predetermined cabin unit and carrying the predetermined cabin unit, the predetermined cabin unit being associated with the activity of the first user; and
    generate, to the traveling unit connected to the predetermined cabin unit where a predetermined number of the first users or more is riding, a command for placing the predetermined cabin unit at a predetermined location.

2. The information processing device according to claim 1, wherein:
    the controller is configured to generate, when the information related to the request to use the cabin unit is acquired from the terminal of the first user, a command for causing the traveling unit to pick up the first user in a state where the predetermined cabin unit is connected, the number of the first users who use the predetermined cabin unit is smaller than the predetermined number, and a second user does not use the predetermined cabin unit; and
    the second user is a user who intends the traveling on the cabin unit rather than the activity in the cabin unit.

3. The information processing device according to claim 1, wherein the controller is configured to generate, when the number of the first users riding on the predetermined cabin unit is smaller than the predetermined number, a command for causing the traveling unit to travel while the traveling unit is keeping connection to the predetermined cabin unit.

4. The information processing device according to claim 1, wherein:
    the controller is configured to generate, to the traveling unit connected to the cabin unit and carrying the cabin unit where a second user is riding, a command for causing the traveling unit to travel through a destination of the second user; and
    the second user is a user who intends the traveling on the cabin unit rather than the activity in the cabin unit.

5. The information processing device according to claim 1, wherein the controller is configured to generate, after the traveling unit places the predetermined cabin unit at the predetermined location, a command for causing the traveling unit to travel while being connected to another cabin unit.

6. The information processing device according to claim 1, wherein:
    the activity is exercise; and
    the predetermined cabin unit is a cabin unit including exercise equipment.

7. The information processing device according to claim 6, wherein the exercise equipment is available for a second user who intends the traveling on the cabin unit rather than the activity in the cabin unit.

8. An information processing method to be executed by a computer when information related to a request to use a cabin unit is acquired from a terminal of a first user who intends an activity in the cabin unit rather than traveling on the cabin unit, the information processing method comprising:

generating a command for causing a traveling unit to pick up the first user, the traveling unit being connected to a predetermined cabin unit and carrying the predetermined cabin unit, the predetermined cabin unit being associated with the activity of the first user; and generating, to the traveling unit connected to the predetermined cabin unit where a predetermined number of the first users or more is riding, a command for placing the predetermined cabin unit at a predetermined location.

9. The information processing method according to claim 8, further comprising generating, when the information related to the request to use the cabin unit is acquired from the terminal of the first user, a command for causing the traveling unit to pick up the first user in a state where the predetermined cabin unit is connected, the number of the first users who use the predetermined cabin unit is smaller than the predetermined number, and a second user does not use the predetermined cabin unit, wherein the second user is a user who intends the traveling on the cabin unit rather than the activity in the cabin unit.

10. The information processing method according to claim 8, further comprising generating, when the number of the first users riding on the predetermined cabin unit is smaller than the predetermined number, a command for causing the traveling unit to travel while the traveling unit is keeping connection to the predetermined cabin unit.

11. The information processing method according to claim 8, further comprising generating, to the traveling unit connected to the cabin unit and carrying the cabin unit where a second user is riding, a command for causing the traveling unit to travel through a destination of the second user, wherein the second user is a user who intends the traveling on the cabin unit rather than the activity in the cabin unit.

12. The information processing method according to claim 8, further comprising generating, after the traveling unit places the predetermined cabin unit at the predetermined location, a command for causing the traveling unit to travel while being connected to another cabin unit.

13. The information processing method according to claim 8, wherein:
the activity is exercise; and
the predetermined cabin unit is a cabin unit including exercise equipment.

14. The information processing method according to claim 13, wherein the exercise equipment is available for a second user who intends the traveling on the cabin unit rather than the activity in the cabin unit.

15. A system comprising:
a cabin unit configured such that a user rides on the cabin unit;
a traveling unit configured to be connected to the cabin unit and configured to carry the cabin unit, the traveling unit being able to travel without being connected to the cabin unit;
a terminal to be carried by the user; and
a controller configured to control the traveling unit, wherein
the controller is configured to
generate, when information related to a request to use the cabin unit is acquired from the terminal of a first user who intends an activity in the cabin unit rather than traveling by the cabin unit, a command for causing the traveling unit to pick up the first user, the traveling unit being connected to a predetermined cabin unit and carrying the predetermined cabin unit, the predetermined cabin unit being associated with the activity of the first user, and
generate, to the traveling unit connected to the predetermined cabin unit where a predetermined number of the first users or more is riding, a command for placing the predetermined cabin unit at a predetermined location.

16. The system according to claim 15, wherein:
the controller is configured to generate, when the information related to the request to use the cabin unit is acquired from the terminal of the first user, a command for causing the traveling unit to pick up the first user in a state where the predetermined cabin unit is connected, the number of the first users who use the predetermined cabin unit is smaller than the predetermined number, and a second user does not use the predetermined cabin unit, and
the second user is a user who intends the traveling on the cabin unit rather than the activity in the cabin unit.

17. The system according to claim 15, wherein the controller is configured to generate, when the number of the first users riding on the predetermined cabin unit is smaller than the predetermined number, a command for causing the traveling unit to travel while the traveling unit is keeping connection to the predetermined cabin unit.

18. The system according to claim 15, wherein:
the controller is configured to generate, to the traveling unit connected to the cabin unit and carrying the cabin unit where a second user is riding, a command for causing the traveling unit to travel through a destination of the second user; and
the second user is a user who intends the traveling on the cabin unit rather than the activity in the cabin unit.

19. The system according to claim 15, wherein the controller is configured to generate, after the traveling unit places the predetermined cabin unit at the predetermined location, a command for causing the traveling unit to travel while being connected to another cabin unit.

20. The system according to claim 15, wherein:
the activity is exercise; and
the predetermined cabin unit is a cabin unit including exercise equipment.

* * * * *